(12) United States Patent
Hasegawa et al.

(10) Patent No.: US 8,648,130 B2
(45) Date of Patent: Feb. 11, 2014

(54) RESIN COMPOSITION, TRANSPARENT MEMBER OBTAINED FROM THE RESIN COMPOSITION, AND USE OF THE SAME

(75) Inventors: Akira Hasegawa, Chiba (JP); Kenichi Goto, Chiba (JP); Toyoharu Hayashi, Yokohama (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 186 days.

(21) Appl. No.: 12/746,963

(22) PCT Filed: Nov. 28, 2008

(86) PCT No.: PCT/JP2008/003514
§ 371 (c)(1),
(2), (4) Date: Jun. 9, 2010

(87) PCT Pub. No.: WO2009/078129
PCT Pub. Date: Jun. 25, 2009

(65) Prior Publication Data
US 2010/0256271 A1 Oct. 7, 2010

(30) Foreign Application Priority Data

Dec. 17, 2007 (JP) ................. 2007-325033

(51) Int. Cl.
*C08K 9/04* (2006.01)
(52) U.S. Cl.
USPC ............................ 523/200; 524/589; 524/609
(58) Field of Classification Search
USPC .................. 523/200; 524/589, 609
See application file for complete search history.

(56) References Cited

U.S. PATENT DOCUMENTS 7,169,845 B2 * 1/2007 Tamura et al. ................ 524/609
7,803,347 B2 * 9/2010 Ajiri .......................... 423/592.1

FOREIGN PATENT DOCUMENTS

| JP | 11-011947 A | 1/1999 |
|---|---|---|
| JP | 2005-194148 A | 7/2005 |
| JP | 2007-204739 A | 8/2007 |
| JP | 2007-238661 A | 9/2007 |
| JP | 2007-246334 A | 9/2007 |
| JP | 2007-270097 A | 10/2007 |
| KR | 10-2007-0000636 | 1/2007 |

OTHER PUBLICATIONS

Machine translation of JP 2007-238661 A, Sep. 20, 2007.*
Machine translation of JP 2007-204739 A, Oct. 16, 2007.*
Machine translation of JP 2007-270097, Oct. 18, 2007.*
Tadafumi Adschiri et al., "Production of Organic-Inorganic Biomolecule Hybrid Nanoparticles According to Hydrothermal Synthesis Method in Supercritical Water", Chemical Engineering of Japan, Dec. 5, 2006, vol. 70, No. 12, pp. 683-686 (with English language translation).
Tadafumi Adschiri, "Synthesis and Perfect Dispersion of Organic-Inorganic Nanoparticles Under Supercritical Hydrothermal Conditions", Expected Materials for the Future, Oct. 10, 2007, vol. 7, No. 10, pp. 24-29 (with English language translation).
Dinesh Rangappa et al., "Transparent $CoAl_2O_4$ Hybrid Nano Pigment by Organic Ligand-Assisted Supercritical Water", J. Am. Chem. Soc., Aug. 17, 2007, vol. 129, No. 36, pp. 11061-11066.
Satoshi Ohara et al., "Hydrothermal Synthesis of Organic-Inorganic Hybrid Nanoparticles in Supercritical Water", Journal of the Japan Society of Powder and Powder Metallurgy, Jan. 2007, vol. 54, No. 1, pp. 48-52 (with English language translation).
Yusuke Imai et al., "Synthesis of High Refractive Index Nanoparticle/ Polycarbonate Hybrids", Polymer Preprints, Japan, vol. 56, No. 2, 2007, pp. 3047-3048 (with English Abstract).

* cited by examiner

*Primary Examiner* — Vickey Nerangis
(74) *Attorney, Agent, or Firm* — Buchanan Ingersoll & Rooney PC

(57) ABSTRACT

The present invention provides a resin composition which enables to obtain a transparent member having excellent transparency, high refractive index and high strength and an optical component composed of such a transparent member. A resin composition of the present invention comprises a polymerizable compound or a resin component and an organically modified fine particle produced in the presence of a high-temperature high-pressure water as a reaction field, in which an organic material is bonded to the surface of a metal fine particle.

16 Claims, No Drawings

RESIN COMPOSITION, TRANSPARENT MEMBER OBTAINED FROM THE RESIN COMPOSITION, AND USE OF THE SAME

TECHNICAL FIELD

The present invention relates to a resin composition, a transparent member obtained from the resin composition and use of the same.

BACKGROUND ART

Since an inorganic glass has excellent general properties such as excellent transparency and the like, the inorganic glass has been widely used in many fields as an optical member. However, the inorganic glass has drawbacks such that it is heavy and easily broken and low workability and low productivity. As a result, a transparent optical resin has been actively under development as a material for replacing the inorganic glass.

An amorphous thermoplastic resin having typical examples of an acrylic based resin, a styrene based resin, a polycarbonate resin, a polyester based resin, an olefin based resin, an alicyclic acrylic based resin, an alicyclic olefin based resin, a polyurethane resin, a polyether resin, a polyamide resin and a polyimide resin, or a curable resin such as an epoxy resin, an unsaturated polyester resin or a silicon resin has excellent transparency in the visible wavelength region. Besides, such a resin is a general-purpose transparent resin material having excellent properties such as moldability, mass productivity, flexibility, toughness, impact resistance or the like as compared to the inorganic glass material.

It has been expected that materials of high refractive index optical members such as a thin and lightweight optical lens (a spectacle lens, a Fresnel lens, a pickup lens in information recording devices such as CD, DVD and the like, a lens for cameras such as a digital cameras and the like), an optical prism, an optical waveguide, an optical fiber, a thin-film molded product, an adhesive for optical uses, a sealing material for optical semiconductors, a diffraction grating, a light guiding plate, a liquid crystal substrate, a light reflection plate, an anti-reflection plate and the like are developed by providing such a transparent resin material with a high refractive index.

For example, in the field of spectacle lenses, in order to satisfy the need of fashionability, the center thickness, edge thickness and curvature of a lens are required to be reduced to make the lens generally thin. From this point, ever higher refractive index has been in demand.

In recent years, high refractive index has been actively studied by using a monomer containing an element having a large atomic number such as sulfur, halogen or the like. Examples thereof include a resin ($n_d$ of from about 1.60 to 1.67) obtained by subjecting a thiol compound and an isocyanate compound to thermal polymerization to form a thiourethane bond, a resin ($n_d$ of about 1.7) obtained by subjecting an episulfide or epithiosulfide compound to polymerization/curing and the like.

Similarly, there has been strongly demanded a general-purpose transparent resin having a high refractive index, particularly a high refractive index resin having a refractive index of 1.7 or more such as an amorphous thermoplastic resin having typical examples of an acrylic based resin, a styrene based resin, a polycarbonate resin, a polyester resin, an olefin based resin, an alicyclic acrylic resin, an alicyclic olefin resin, a polyurethane resin, a polyether resin, a polyamide resin and a polyimide resin, and a curable resin such as an epoxy resin, an unsaturated polyester resin, a silicon resin or the like.

The refractive index of an organic resin is determined depending on the element in use and molecular structure so that it is also increased by introduction of such a halogen element or a sulfur element. However, the refractive index is usually limited to the range of about 1.4 to 1.7.

For example, in a polymer optical fiber using an acrylic based resin such as polymethyl methacrylate (PMMA) or the like, a core portion (central portion in the cross section of the optical fiber) has higher refractive index than that of a clad portion (outer peripheral portion). It is possible to increase the numerical aperture corresponding to the maximum angle capable of propagating light as the difference of refractive indexes is greater.

For example, in a light emitting diode, a light emitting element portion is sealed with an epoxy resin or the like. In general, when the refractive index of a semiconductor constituting a semiconductor element portion is extremely high and the refractive index of a material in contact therewith is low, a critical angle is also small and total reflection easily occurs. Accordingly, a light emitting element is wrapped with a material having a higher refractive index, whereby it is possible to increase the angle causing total reflection. Thereby, the luminous-flux extraction efficiency on the outside of the portion is improved.

Furthermore, there has been demanded that a component comprised of a plurality of materials having different refractive indexes, for example, an optical fiber, an optical waveguide and a part of a lens, should be developed, and materials having a refractive index distribution should be developed as well. In order to cope with the demand of these materials, it is essential that the refractive index can be freely controlled.

Such a resin to be used for an optical component, for example, a thermoplastic resin having typical examples of an acrylic based resin, a styrene based resin, a polycarbonate resin, a polyester resin, an olefin based resin, an alicyclic acrylic resin, an alicyclic olefin resin, a polyurethane resin, a polyether resin, a polyamide resin, a polyimide resin and the like; a curable resin such as an epoxy resin, an unsaturated polyester resin, a silicon resin or the like; or a resin obtained by polymerizing a monomer containing an element having a large atomic number such as sulfur, halogen or the like is strongly demanded to have a high refractive index.

In recent years, for the purpose of achieving a resin having a high refractive index, there has been proposed a technique for forming a colorless and transparent resin having a high refractive index by introducing transparent inorganic oxide fine particles with a high refractive index having a crystal structure such as Zr, Sn, Sb, Mo, In, Zn, Ti or the like or complex oxides thereof into the resin while maintaining the dispersion state (Patent Document 1, Non-Patent Document 1 and the like). However, in the above technique, in order to maintain high dispersibility and transparency, it needs to introduce a sulfonic acid group into the resin, thus leading to deterioration of physical properties such that the hygroscopicity becomes large or the like.

On the other hand, in order to suppress the cohesive force and surface activity of particles in the resin, there have been proposed metal oxide fine particles having a surface coating layer containing an organic material (Patent Documents 2 and 3). However, in these techniques, it has not yet been sufficient enough to design a resin having a high refractive index while using the amount of a matrix capable of maintaining strength or the like. Namely, when metal oxide fine particles are excessively added to improve the refractive index, the resin becomes, on the contrary, fragile.

As described above, there has been demanded a composite material which is transparent without causing agglomeration even though fine particles are incorporated in a high proportion, and further has a high refraction index and high strength in various product fields.

Patent Document 1: Japanese Patent Laid-open No. 2007-246334
Patent Document 2: Japanese Patent Laid-open No. 2007-204739
Patent Document 3: Japanese Patent Laid-open No. 2007-238661
Patent Document 4: Japanese Patent Laid-open No. 2007-270097
Patent Document 5: Japanese Patent Laid-open No. 2005-194148
Non-Patent Document 1: Polymer Preprints, Japan, Vol. 56, No. 2 (2007) pp. 3047-3048

DISCLOSURE OF THE INVENTION

An object of the present invention is to provide a resin composition which enables to obtain a transparent member having excellent transparency, high refractive index and high strength, and an optical member composed of the transparent member.

In order to solve the above object, the present inventors have conducted an extensive study and as a result, have found a transparent member having excellent transparency, high refractive index and high strength because organically modified fine particles produced in the presence of a high-temperature high-pressure water as a reaction field, in which an organic material is bonded to the surface of metal fine particles, are very excellent in dispersibility to a resin. Thus, the present invention has been completed.

That is, the present invention is specified by the following matters:

[1] a resin composition containing a polymerizable compound or a resin component and an organically modified fine particle produced in the presence of a high-temperature high-pressure water as a reaction field, in which an organic material is bonded to the surface of a metal fine particle;

[2] the resin composition as set forth in [1], wherein said high-temperature high-pressure water is water in the supercritical state or subcritical state;

[3] the resin composition as set forth in [1] or [2], wherein said organically modified fine particle is produced by heating and pressurizing a solution containing a metal salt and an organic material at a temperature of 200 to 500 degrees centigrade under a pressure of 5 to 50 MPa to make a water into the supercritical state or subcritical state;

[4] the resin composition as set forth in [1] or [2], wherein said organically modified fine particle is produced by heating and pressurizing a solution containing a metal fine particle and an organic material at a temperature of 200 to 500 degrees centigrade under a pressure of 5 to 50 MPa to make a water into the supercritical state or subcritical state;

[5] the resin composition as set forth in any one of [1] to [4], wherein the refractive index of the e-ray of a molded product obtained from the resin composition is not less than 1.71;

[6] the resin composition as set forth in any one of [1] to [5], wherein the organic material is one or more kinds selected from the group consisting of an alcohol compound, an aldehyde compound, a carboxylic acid compound, an amine compound, a thiol compound, an amide compound, a ketone compound, an oxime compound, phosgene, an enamine compound, an amino acid, a peptide compound, saccharide and a polymer having a polar group;

[7] the resin composition as set forth in any one of [1] to [6], wherein the metal fine particles in the organically modified fine particle contains a metal oxide fine particle and/or a metal sulfide fine particle, and a metal component of the metal oxide fine particle or the metal sulfide fine particle is one or more kinds selected from the group consisting of titanium, zirconium, zinc, antimony, magnesium, potassium, barium, aluminum, calcium, tellurium, selenium, cerium and tin;

[8] the resin composition as set forth in [7], wherein said metal oxide fine particle is a ZnO-containing fine particle, a $ZrO_2$-containing fine particle, a $TiO_2$-containing fine particle or a Sn and $TiO_2$-containing fine particle;

[9] the resin composition as set forth in [7], wherein the metal sulfide fine particles are ZnS-containing fine particles;

[10] the resin composition as set forth in any one of [1] to [9], wherein an average particle diameter of the organically modified fine particle is from 1 to 100 nm;

[11] the resin composition as set forth in any one of [1] to [10], wherein the organically modified fine particle is contained in an amount of 1 to 300 parts by weight, based on 100 parts by weight of the polymerizable compound;

[12] the resin composition as set forth in any one of [1] to [10], wherein the organically modified fine particles are contained in an amount of 1 to 300 parts by weight, based on 100 parts by weight of the resin component;

[13] the resin composition as set forth in any one of [1] to [12], wherein the metal fine particle is provided with one or more coating layers composed of an inorganic material on the surface thereof and the organic material is bonded to the surface of the coating layer(s);

[14] a transparent member obtained from the resin composition as set forth in anyone of [1] to [13] containing a polymer obtained by polymerizing the polymerizable compound or the resin component and the organically modified fine particles;

[15] the transparent member as set forth in [14], wherein the resin component is one or more kinds selected from the group consisting of a polycarbonate resin, a cyclic olefin copolymer, a polymethylpentene resin and a polyimide resin, and the polymer is one or more kinds selected from the group consisting of an allyl diglycol carbonate resin, a thiourethane resin, an episulfide resin and an acrylic resin;

[16] the transparent member as set forth in [14] or [15], wherein a metal component is contained in an amount of 1 to 300 parts by weight, based on 100 parts by weight of the polymer or the resin component;

[17] an optical component composed of the transparent member as set forth in any one of [14] to [16];

[18] an optical lens composed of the transparent member as set forth in any one of [14] to [16]; and

[19] an additive for optical material containing an organically modified fine particle as set forth in any one of [1] to [13]. Incidentally, in the present invention, the resin composition refers to a composition before molding, and also contains any of a liquid mixture and a solid mixture.

According to the resin composition of the present invention, it is possible to provide a transparent member having excellent transparency, high refractive index and high strength.

BEST MODE FOR CARRYING OUT THE INVENTION

The present invention will be described in more detail below.

The resin composition of the present invention contains a polymerizable compound or a resin component and organically modified fine particles produced in the presence of high-temperature high-pressure water as a reaction field in which an organic material is bonded to the surface of metal fine particles.

The Organically Modified Fine Particles

When the organically modified fine particles in the present invention are dispersed in a medium, its composition is desired to exhibit high transparency to be useful for optical applications. Therefore, it is desirable that the organically modified fine particles are dispersed in an organic solvent to give a transparent colloid. The fact that the composition obtained by dispersing organically modified fine particles in a medium and a molded product exhibit high transparency indicates that organically modified fine particles move in the medium as particles having a sufficiently smaller size than the wavelength of light, and are suitably used for optical applications without absorption, i.e., without coloration in the visible wavelength region of 400 to 800 nm.

Incidentally, the organically modified fine particles can be used as an additive for optical materials containing the particles.

The organically modified fine particles in the present invention are synthesized and/or are obtained by organically modifying the surface of metal fine particles in the presence of high-temperature high-pressure water as a reaction field, more preferably synthesized and/or are obtained by organically modifying the surface of metal fine particles by a hydrothermal reaction in water in the subcritical state or supercritical state. In the present invention, to make a water into the subcritical state or supercritical state, the temperature of 200 to 500 degrees centigrade and pressure of 5 to 50 MPa.

Herein, water in the subcritical state refers to water in the subcritical state under temperature of 200 to 374 degrees centigrade and pressure of 5 to 22.1 MPa, while water in the supercritical state refers to water in the supercritical state under the conditions of a temperature exceeding 374 degrees centigrade and a pressure exceeding 22.1 MPa. In particular, in the supercritical water range, water and an organic material form a homogeneous phase, and water and an acid functions as a catalyst, whereby an organic reaction is known to proceed even without adding a catalyst, and particles and an organic material easily form a bond.

The organically modified fine particles in the present invention preferably have a refractive index higher than that of an optical transparent resin in general. Specifically, organically modified fine particles are preferably fine particles in which a surface of metal oxide fine particles and/or metal sulfide fine particles containing one or more metals selected from titanium, zirconium, zinc, antimony, magnesium, potassium, barium, aluminum, calcium, tellurium, selenium, cerium and tin is modified, coated or reformed with an organic material.

Furthermore, examples of the structure of the metal fine particles used for the aforementioned organically modified fine particles include a crystal structure formed with one or more aforementioned metals, a core/shell structure formed by coating one or more inorganic fine particles with one or more other organic materials, and the like.

The average particle diameter of the aforementioned organically modified fine particles is from 1 to 100 nm, preferably from 1 to 50 nm and more preferably from 1 to 30 nm from the viewpoint of achieving higher transparency. The average particle diameter is measured by a known method including carrying out analysis of transmission electron microscope (TEM) images. Incidentally, the average particle diameter refers to a particle diameter of particles containing not only primary particles but also secondary particles (agglomerated particles) of organically modified fine particles.

As a method for producing organically modified fine particles used in the present invention, there can be cited (I) a method involving carrying out synthesis of metal fine particles and organic modification at the same time and (II) a method involving modifying a surface of metal fine particles with an organic material after the synthesis of the metal fine particles.

First, (I) a method for producing organically modified fine particles by carrying out synthesis of metal fine particles and organic modification at the same time will be illustrated.

Examples of the method involving carrying out synthesis of metal fine particles and organic modification at the same time include a reverse micelle method, a hot soap method, a high-temperature and high-pressure method and the like. In the present invention, of these methods, preferably used is a high-temperature and high-pressure method, and more preferably used is a method involving synthesis and modification in water in the subcritical state or supercritical state.

An apparatus used in the high-temperature and high-pressure method is not particularly restricted as long as high-temperature and high-pressure conditions are satisfied, but examples thereof include a flow-type apparatus, a batch-type autoclave and the like.

First, one or more aqueous metal salt solutions and one or more molecule for organic modifying (organic material) are put into a reaction vessel and the resultant vessel is sealed. The inside of the reaction vessel is heated under conditions of a temperature of 200 to 500 degrees centigrade and a pressure of 5 to 50 MPa, and water in the supercritical state or subcritical state is used as a reaction field for the reaction, whereby it is possible to synthesize organically surface-modified fine particles of 1 to 100 nm.

The amount of the metal salt and the molecule for organic modifying and the like to be added is different depending on the kind of the metal component of the metal salt, the kind of the molecule for organic modifying and the like, and is not particularly restricted.

The mixture obtained after the reaction is dispersed in an organic solvent and/or distilled water, and an operation such as washing, solution separation, re-precipitation, centrifugal separation, decantation, filtration, concentration or the like is carried out, whereby it is possible to isolate organically modified fine particles. Depending on the kind of the molecule for organic modifying, it is possible to obtain organically modified fine particles in a powder form or oil form.

As an additive for optical materials, isolated organically modified fine particles may be used as they are, a prescribed additive may be added to the isolated organically modified fine particles, or a mixture obtained after the reaction may be used as it is.

Examples of the metal salt include chloride, hydroxide, nitrate salt, sulfate salt and the like. Specific examples thereof include titanium chloride, tin chloride, barium hydroxide, aluminum hydroxide, zinc nitrate, cerium nitrate, titanium sulfate, zirconium chloride oxide and the like.

Examples of the molecule for organic modifying include an alcohol compound, an aldehyde compound, a carboxylic acid compound, an amine compound, a thiol compound, an epoxy compound, an amide compound, a ketone compound, an oxime compound, phosgene, an enamine compound, an amino acid, a peptide compound, saccharide and a polymer having a polar group.

Examples of the alcohol compound include pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, pentanediol, hexanediol, heptanediol, octanediol, nonanediol, decanediol, undecanediol, dodecanediol, tridecanediol, tetradecanediol, pentadecanediol, hexadecanediol, heptadecanediol, octadecanediol, nonadecanediol, eicosanediol, a compound having a benzene ring and the like. One of or a combination of two or more of such compounds may be used.

Examples of the aldehyde compound include pentanal, hexanal, heptanal, octanal, nonanal, decanal, undecanal, dodecanal, tridecanal, tetradecanal, pentadecanal, hexadecanal, heptadecanal, octadecanal, nonadecanal, eicosanal, a dialdehyde compound and the like. One of or a combination of two or more of such compounds may be used.

Examples of the carboxylic acid compound include pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, unsaturated fatty acid, dicarboxylic acid and the like. One of or a combination of two or more of such compounds may be used.

Examples of the unsaturated fatty acid include myristoleic acid, palmitoleic acid, oleic acid, elaidic acid, vaccenic acid, gadoleic acid, linoleic acid, linolenic acid and the like. One of or a combination of two or more of such acids may be used.

Examples of the dicarboxylic acid include pentanedioic acid, hexanedioic acid, heptanedioic acid, octanedioic acid, nonanedioic acid, decanedioic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, eicosanedioic acid and the like. One of or a combination of two or more of such acids may be used.

Examples of the amine compound include pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, nonadecylamine, eicosylamine, pentanediamine, hexanediamine, heptanediamine, octanediamine, nonanediamine, decanediamine, undecanediamine, dodecanediamine, tridecanediamine, tetradecanediamine, pentadecanediamine, hexadecanediamine, heptadecanediamine, octadecanediamine, nonadecanediamine and eicosanediamine. One of or a combination of two or more of such compounds may be used.

Examples of the thiol compound include pentanethiol, hexanethiol, heptanethiol, octanethiol, nonanethiol, decanethiol, undecanethiol, dodecanethiol, tridecanethiol, tetradecanethiol, pentadecanethiol, hexadecanethiol, heptadecanethiol, octadecanethiol, nonadecanethiol, eicosanethiol, pentanedithiol, hexanedithiol, heptanedithiol, octanedithiol, nonanedithiol, decanedithiol, undecanedithiol, dodecanedithiol, tridecanedithiol, tetradecanedithiol, pentadecanedithiol, hexadecanedithiol, heptadecanedithiol, octadecanedithiol, nonadecanedithiol and eicosanedithiol. One of or a combination of two or more of such compounds may be used.

Examples of the epoxy compound include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloxy methylcyclohexene oxide, 3-acryloyloxy methylcyclohexene oxide, 3-vinylcyclohexene oxide, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)cyclohexane-m-dioxa ne, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexanec arboxylate, methylene bis(3,4-epoxycyclohexane), dicyclopentadiene diepoxide, di(3,4-epoxycyclohexylmethyl)ether of ethylene glycol, ethylene bis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerine triglycidyl ether, trimethylolpropane triglycidyl ether, polyethylene glycol diglycidyl ether, polypropylene glycol diglycidyl ether, 1,1,3-tetradecadiene dioxide, limonene dioxide, 1,2,7,8-diepoxyoctane, 1,2,5,6-diepoxycyclooctane and the like. One of or a combination of two or more of such compounds may be used.

Examples of the amide compound include N-methylformamide, N,N-dimethylformamide, N,N-diethylformamide, N-methylacetamide, N,N-dimethylacetamide, N-methylpropionamide, N-methyl-2-pyrrolidone, 2-pyrrolidinone, 1,3-dimethyl-2-imidazolidinone, acrylamide, adipamide, acetamide, isonicotinamide, N-isopropylacrylamide, N-isopropyl-1-piperazine acetamide, urea amidolyase, 2-ethoxybenzamide, erucylamide, oleamide, succinamide, succindiamide, salicylamide, diacetamide, diacetoneacrylamide, diisopropylformamide, N,N-diisopropylisobutyramide, N,N-diethylacetoacetamide, N,N-diethylacetamide, N,N-diethyldodecanamide, N,N-diethylnicotinamide, dicyandiamide, N,N-dibutylformamide, N,N-dipropylacetamide, N,N-dimethylpropionamide, N,N-dimethylbenzamide, stearamide, 2-phenylbutyramide, N-phenylbenzamide, phenoxyacetamide, phthalamide, phthaldiamide, fumaramide, N-butylacetamide, N-butyramide, propanamide, hexanamide, benzamide, benzenesulfonamide, malonamide, malondiamide, methanesulfonamide, N-methylbenzamide and the like. One of or a combination of two or more of such compounds may be used.

Examples of the ketone compound include acetone, methyl ethyl ketone, diethyl ketone, dipropyl ketone, dibutyl ketone, dipentyl ketone, dihexyl ketone, dioctyl ketone, cyclopentanone, cyclohexanone, cycloheptanone, cyclooctanone, acetophenone, phenyl ethyl ketone, phenyl propyl ketone, phenyl butyl ketone, phenyl hexyl ketone, phenyl heptyl ketone, phenyl octyl ketone and the like. One of or a combination of two or more of such compounds may be used.

Examples of the oxime compound include aromatic ketone oximes such as acetone oxime, methyl ethyl ketone oxime, methyl isobutyl ketone oxime, methyl vinyl ketone oxime, cyclopentanone oxime, cyclohexanone oxime, 2,4-pentanedione dioxime, 2,3-butanedione-2-oxime, benzoquinone dioxime, hydroxyiminomalonic acid diethyl ester, 2-(hydroxyimino)ethyl acetoacetate, 2-adamantanone oxime, formaldoxime, acetaldoxime, propionaldehyde oxime, pyruvinaldehyde 1-oxime, acetophenone oxime, benzophenone oxime, 2-acetylfuran oxime, 2-acetylpyridine oxime, 2-acetylthiophene oxime, 1,4-naphthoquinone oxime, anthraquinone dioxime, 4-chromanone oxime, 2-(hydroxyimino)-2-phenylacetonitrile, 2-(hydroxyimino)-2-(1-naphthyl)acetonitrile and the like; benzaldoxime, phenyl acetaldoxime, phenylpropionaldehyde oxime, nifuroxime, 2-(2-phenylacetamide)acetaldoxime, 9-anthraldehyde oxime and the like. One of or a combination of two or more of such compounds may be used.

Examples of the amino acid include histidine, arginine, lysine, glycine, alanine, β-alanine, isoleucine, valine, leucine, serine, threonine, cysteine, cystine, phenylalanine, proline, tyrosine, homoserine, methionine, ε-aminocaproic acid, γ-aminobutyric acid, threonine, asparagine, glutamine, glycyl-glycine, aspartic acid, glutamic acid, δ-aminocaprylic acid and the like. One of or a combination of two or more of such acids may be used.

Examples of the peptide compound include insulin, somatostatin, prolactin, erythropoietin, vasopuressin, oxytocin, calcitonin, gastrin, secretin, pancreozymin, cholecystokinin, angiotensin, enkephalin, endorphin, kyotorphin, tuftsin, thymopoietin, thymosin, thymostimulin, motiline, dynorphin, bombesin, neurotensin, cerulein, bradykinin and the like. One of or a combination of two or more of such compounds may be used.

Examples of the saccharide include aldoses such as glyceraldehyde, erythrose, threose, arabinose, xylose, ribose, glucose, mannose, galactose and the like; ketoses such as xylulose, ribulose, fructose, sorbose and the like; deoxy sugars such as deoxyribose, rhamnose, fucose and the like; and oligosaccharides such as maltose, cellobiose, isomaltose, lactose, sucrose and the like. One of or a combination of two or more of such saccharides can be used.

Preferable examples of the polymer having a polar group include polyacrylonitrile, acrylonitrile-butadiene copolymer, polyvinyl alcohol and ethylene-vinyl alcohol copolymer.

Furthermore, there can be cited a hydrocarbon having two or more hydroxyl groups, aldehyde groups, carboxylic acids, amines, thiols, epoxy groups or amide groups. For example, a compound having thiol and a hydroxyl group, a compound having an amino group and an aldehyde group, and the like can be used.

Of these compounds, more preferably used are an alcohol compound, an aldehyde compound, a carboxylic acid compound, an amine compound, a thiol compound, an epoxy compound, an amide compound and a polymer having a polar group. Further preferably used are an alcohol compound, an aldehyde compound, a carboxylic acid compound, an amine compound and a thiol compound. Hydrocarbon may have two or more functional groups, and hydrocarbon having two or more hydroxyl groups, aldehyde groups, carboxylic acids, amines, thiols, epoxy groups or amide groups is preferably used as well.

The number of carbon atoms of the above molecule for organic modifying is preferably not less than 2 and more preferably not less than 6. The molecule for organic modifying may have a double bond and/or a benzene ring in a molecule, and a hydrogen atom may be substituted with a halogen atom or may not be substituted.

An organic solvent to be used after the reaction is not particularly restricted. In general, as an organic solvent used for washing or solution separation, preferably used is an organic solvent miscible with a molecule for organic modifying in use, while, as an organic solvent used for re-precipitation, preferably used is an organic solvent which is not miscible with a molecule for organic modifying in use.

Next, (II) a method for producing organically modified fine particles in which the surface of metal fine particles is modified with an organic material after the synthesis of metal fine particles will be illustrated.

Examples of the metal fine particles to be used in the present invention include metal oxide fine particles containing metals such as $TiO_2$, $ZrO_2$, $ZnO$, $CdO$, $PbO$, $SiO_2$, $Sb_2O_5$, Sn-containing $TiO_2$ (Sn-modified $TiO_2$) and the like; metal sulfide fine particles containing metals such as CdS, CdSe, ZnSe, CdTe, ZnS, HgS, HgSe, PdS, SbSe and the like; selenide fine particles, telluride fine particles and the like. These may be purchased as a reagent or may be synthesized. As the metal fine particles, preferably used are metal oxide fine particles and metal sulfide fine particles, more preferably used are $TiO_2$, $ZrO_2$, $ZnO$, ZnS or Sn-containing $TiO_2$ fine particles, and further preferably used are Sn-containing $TiO_2$ fine particles from the viewpoint of dispersibility.

The amount of the metal fine particles and the molecule for organic modifying and the like to be added is different depending on the kind of the metal component such as metal fine particles or the kind of the molecule for organic modifying, and is not particularly restricted.

A method for synthesizing metal fine particles is not particularly restricted as long as it is a generally known method. For example, in case of $TiO_2$, the known method described in Journal of Chemical Engineering of Japan, Vol. 1, No. 1, pp. 21-28 (1998) can be used. In case of ZnS, the known method described in Journal of Physical Chemistry, Vol. 100, pp. 468-471 (1996) can be used.

Of metal fine particles, titanium oxide has a particularly high refractive index and high transparency as well so that it is possible to achieve a high refractive index for a resin in a smaller amount as compared to other fine particles. In particular, titanium oxide having a rutile-type crystal form has been known to be excellent in optical properties such as high refractive index and ultraviolet absorption as compared to anatase-type titanium oxide.

The method for synthesizing the above rutile-type titanium oxide is not particularly restricted. A method for synthesizing a tin-modified rutile-type titanium oxide is exemplified below.

As a method for synthesizing a tin-modified rutile-type titanium oxide, first, a tin compound is added to an aqueous solution and then a titanium compound is added thereto. The tin compound and the titanium compound may be added at the same time or either of them may be added first. Furthermore, a mixed compound may also be used. A reaction medium is preferably water, but an organic solvent such as alcohol and the like or a mixed medium of water and an organic solvent may be used.

The tin compound used in the present invention is not particularly restricted. Preferable examples thereof include tin salt compounds such as tin chloride, tin nitrate, tin sulfate, stannate and the like; oxide, hydroxide, metal tin and the like.

Furthermore, preferable examples of the titanium compound used in the present invention include titanium oxide chloride, titanium sulfate, titanium nitrate, titanium alkoxide, hydration acidic titanium (including those obtained by subjecting a titanium compound to hydrolysis in advance under alkaline conditions as well) and the like.

For the amount of the tin compound to be used for the reaction as a modification agent for controlling crystal growth of rutile-type titanium oxide, a molar ratio of tin to titanium (Sn/Ti) is from 0.001 to 2 and preferably from 0.01 to 1. When the amount of tin is smaller than the above range, although ultrafine particles of a rutile-type titanium oxide are generated, a crystal grain diameter and an agglomerated particle diameter become larger. Therefore, there is a possibility to deteriorate the dispersibility. Furthermore, there is a possibility to decrease the transparency of the resin composition. When the amount is greater than the above range, although the synthesis of ultrafine particles of a rutile-type titanium oxide can be carried out, the time required for the reaction becomes longer. In this case, there is a possibility that ultrafine particles of a rutile-type titanium oxide with the tin compound in a large amount attached thereto might be obtained. Furthermore, when the amount is greater than the above range, the amount of residual tin compound becomes great, so there is a possibility to deteriorate the particle refractive index.

The Ti concentration in the reaction solution is preferably from 0.07 to 5 mol/l and more preferably from 0.1 to 1 mol/l. In the Ti concentration which is lower than the above range, even though a tin compound is added in the range of 0.01 to 0.03 of Sn/Ti (molar ratio), there is a possibility to generate ultrafine particles of a mixed titanium oxide of an anatase type and a rutile type. Likewise, in the Ti concentration which is lower than the above range, when a tin compound is added in the range of greater than 0.03 of Sn/Ti (molar ratio), there is a possibility to generate mixed ultrafine particles of titanium oxide and tin oxide containing a rutile-type tin oxide.

The pH of the reaction solution is preferably from −1 to 3. As needed, the pH is adjusted with hydrochloric acid, nitric acid or the like. When the reaction is carried out under the condition of a pH of greater than 3 and when a tin compound is not added, an anatase-type titanium oxide could be resulted. In order to avoid this, when a tin compound is added to obtain a rutile structure, there is a possibility to generate a different substance other than a rutile-type titanium oxide such as a tin oxide or the like.

The reaction temperature is not particularly limited as long as the Ti concentration and pH are in the above range. But the reaction temperature is preferably from −10 to 100 degrees centigrade and more preferably from 20 to 60 degrees centigrade. The time required for the completion of the reaction can be determined depending on the reaction temperature, but the reaction is usually carried out for 0.5 to 10 hours.

For the amount of the tin compound contained in ultrafine particles of a tin-modified rutile-type titanium oxide generated by the above reaction, an Sn/Ti molar ratio is preferably from 0.001 to 0.5. When the amount of tin is smaller than the lower limit, a particle diameter of the ultrafine particles of a rutile-type titanium oxide becomes larger. Thus, there is a possibility to deteriorate the dispersability. Further, when the amount is more than the upper limit, crystal growth and agglomeration are controlled more efficiently to obtain ultrafine particles having a small particle diameter. However, ultrafine particles of a rutile-type titanium oxide in which the tin compound is attached on the surface thereof in a large amount are obtained. As a result, there is a possibility to obtain ultrafine particles having a low refractive index.

A short axis and a long axis of a crystal grain diameter of ultrafine particles of a tin-modified rutile-type titanium oxide obtained according to this method have a length of 2 to 20 nm, and an average agglomerated particle diameter is from 10 to 100 nm.

A reaction mechanism for obtaining ultrafine particles of a tin-modified rutile-type titanium oxide of the present invention has not at present been fully clarified, but it is characterized in that its surface is modified with a tin compound. It is assumed that a tin compound used as a raw material, tin ion dissociated in a solution or a tin compound generated in a solution by hydrolysis is attached to the surface of titanium oxide through coordinate bond, adsorption, chemical bond or the like. Further, it is assumed that this happens by adding a tin compound as a modification agent under the formation condition of a rutile-type titanium oxide, not an anatase type by nature, thus resulting in suppressing crystal growth in the direction of a long axis. This can also be observed from the fact that the amount of the modified tin compound necessary for obtaining ultrafine particles of a tin-modified titanium oxide in which a crystal grain diameter of ultrafine particles is from 2 to 20 nm is far off from the amount for complete coverage of titanium oxide, and a molar ratio to titanium is small that is from 0.001 to 0.5.

The reaction product obtained as described above may be used as ultrafine particles of a tin-modified rutile-type titanium oxide at the present state or a sol thereof, and may be subjected to a desired post-treatment. That is, vacuum concentration using an evaporator, purification according to a known method such as ultrafiltration or the like, or concentration to an appropriate concentration can also be carried out. Also, a white precipitate can be obtained by centrifugal separation and then can be re-dispersed in water or other desired organic solvent. A sol containing ultrafine particles of a tin-modified rutile-type titanium oxide which are dispersed in water can also be used as a sol containing ultrafine particles of a tin-modified rutile-type titanium oxide which are dispersed in an organic solvent by using solvent substitution to an organic solvent such as alcohols including methanol and the like, and cellosolves including 2-methoxyethanol and the like.

The metal fine particles used in the present invention are provided with one or more coating layers composed of an inorganic material on the surface thereof, and the organic material may be bonded to the surface of the coating layer(s).

Examples of the inorganic material constituting the coating layer(s) include silicon oxide ($SiO_2$), zirconium oxide, zinc oxide, tin oxide, antimony oxide, aluminum oxide and the like. By having one or more coating layers composed of an inorganic material on the surface of metal fine particles, it is possible to suppress the activity of metal fine particles causing deterioration of properties of the transparent member.

A method for preparing a coating layer containing silicon oxide ($SiO_2$) as an inorganic material will be described below.

The coating layer, that is, the coating layer containing silicon oxide stated herein is a two-layered coating layer. It is characterized in that an inner layer is obtained according to Step (1), an outer layer is obtained according to Step (2), and the weight ratio of the silicon oxide coating layer to the fine nuclear particles is from 0.001 to 20 in terms of $SiO_2$.

(1) Step of reacting silicon oxide having the weight ratio to nucleus (A) of 0.001 to 10 in terms of $SiO_2$ with the nucleus (A) under the condition of a pH of less than 7 (pH<7); and (2) Step of reacting silicon oxide having the weight ratio to nucleus (A) of 0.001 to 10 in terms of $SiO_2$ with coating ultrafine particles obtained in Step (1) under the condition of a pH of not less than 7 (pH≥7).

In the present invention, when ultrafine particles of a tin-modified rutile-type titanium oxide synthesized as described above or the sol thereof is used for a resin composition or an optical component obtained from the resin composition, it is possible to impart light resistance in order to prevent deterioration of neighbor organic materials due to photo-catalytic properties of titanium oxide. For this purpose, ultrafine particles of a rutile-type titanium oxide are provided with a coating layer containing silicon oxide. Incidentally, coating stated herein refers to both the surface of ultrafine particles completely or partly covered.

Examples of the silicon oxide used for the above coating include silicates such as colloidal silica, a silicic acid sol, sodium silicate, potassium silicate and the like. The silicon oxide stated herein may be an amorphous oxide, a crystalline oxide or may be in the hydrated state. Further, it may be a silicic acid, a silicate oligomer or salts thereof, or may be those adhered or bonded to the surface of fine nuclear particles.

As a method for forming a coating layer, a sol containing ultrafine particles of a tin-modified rutile-type titanium oxide is first prepared. The sol prepared as described above is diluted or concentrated, and is preferably in the range of 0.01 to 20 weight % and more preferably in the range of 0.1 to 5 weight % as a solid content. When the solid content of a dispersion solution is less than 0.01 weight %, the productivity is low and it is not industrially available. When the solid content of the dispersion solution is higher than 20 weight %, there is a possibility to form an agglomerate of the resultant ultrafine particles.

A solution obtained by dissolving silicon oxide in water and/or an organic solvent is continuously or intermittently added to the reaction solution containing fine nuclear particles (in this case, indicating nucleus (A), i.e., ultrafine particles of a tin-modified rutile-type titanium oxide) to carryout the reaction on the surface of fine nuclear particles. It is preferable to add dropwise over 0.1 to 100 hours such that the sol of fine nuclear particles is not gelated. After the completion of dropwise addition of silicon oxide, the concentration of the reaction solution is preferably from 0.01 to 5 weight % in terms of silicon oxide. When the concentration after the completion of dropwise addition of silicon oxide is lower than 0.01 weight %, the productivity is low and it is not industrially available. When it is higher than 5 weight % (only with silicon oxide), there is a possibility to proceed with the polymerization excessively to generate an insoluble matter of silicon oxide.

[Step (1): Step of reacting silicon oxide having the weight ratio to nucleus (A) of 0.001 to 10 in terms of $SiO_2$ with the nucleus (A) under the condition of a pH of less than 7 (pH<7)]

First, silicon oxide having the weight ratio to nucleus (A) of 0.001 to 10 in terms of $SiO_2$ is reacted with fine nuclear particles, that is, the nucleus (A) under the condition of a pH of less than (pH<7).

The silicon oxide used herein is not particularly restricted, but preferably used are colloidal silica and a silicic acid sol. As the amount in use, the weight ratio to the nucleus (A) is preferably from 0.001 to 10 and more preferably from 0.01 to 0.5 in terms of $SiO_2$. When the amount is out of this range, i.e., greater than 10, there is a possibility that a sufficient refractive index might not be obtained. When the amount is out of this range, i.e., smaller than 0.001, there is a possibility to deteriorate the dispersion stability.

The pH of the reaction solution is preferably smaller than 7 and further preferably from 2 to 4. When the pH is not less than 7, there is a possibility to cause agglomeration and gelation of fine nuclear particles, i.e., ultrafine particles of a tin-modified rutile-type titanium oxide. Further, when the pH is excessively smaller than 1, there is a possibility to shield an electric double layer of fine nuclear particles due to excessive plus ions to cause agglomeration. The pH may be adjusted by adding an acidic compound or a basic compound as necessary. For example, examples of the acidic compound include hydrochloric acid, sulfuric acid, nitric acid and the like, while examples of the basic compound include sodium hydroxide, potassium hydroxide and the like.

In this step, a solution obtained by dissolving silicon oxide in water and/or an organic solvent is continuously or intermittently added to the reaction solution containing fine nuclear particles to carry out the reaction on the surface of fine nuclear particles. It is preferable to add dropwise over 0.1 to 100 hours such that the sol of fine nuclear particles is not gelated. When it exceeds 100 hours, it is not economically efficient. When it is less than 0.1 hour, there is a possibility that the reaction might not be fully completed.

The reaction temperature is not particularly restricted, but it is preferably from 0 to 200 degrees centigrade and more preferably from 30 to 100 degrees centigrade. When it is out of this range, that is, higher than 200 degrees centigrade, there is a possibility to cause agglomeration of ultrafine particles. When it is lower than 0 degree centigrade, there is a possibility not to proceed with the reaction fully.

[Step (2): Step of reacting silicon oxide having the weight ratio to nucleus (A) of 0.001 to 10 in terms of $SiO_2$ with coating ultrafine particles obtained in Step (1) under the condition of a pH of not less than 7 (pH≥7)]

The coating ultrafine particle or the sol obtained in Step (1) is peptized as necessary, and then the coating ultrafine particle obtained in Step (1) is subsequently reacted with silicon oxide having the weight ratio to nucleus (A) of 0.001 to 10 in terms of $SiO_2$ under the condition of a pH of not less than 7 (pH≥7).

The silicon oxide used herein is not particularly restricted, but preferably used are colloidal silica and a silicic acid sol. As the amount in use, the weight ratio to the nucleus (A) is preferably from 0.001 to 10 and more preferably from 0.1 to 1 in terms of $SiO_2$. When the weight ratio to the nucleus (A) is greater than 10, there is a possibility that a sufficient refractive index might not be obtained. When the weight ratio to the nucleus (A) is smaller than 0.001, there is a possibility that sufficient light resistance might not be achieved.

The pH of the reaction solution is preferably not less than 7 and more preferably from 8 to 11. The pH may be properly adjusted within this range. When the pH is smaller than 7, there is a possibility that a dense coating layer might not be formed. The pH may be properly adjusted by adding a basic compound. Examples of the basic compound include sodium hydroxide, potassium hydroxide and the like.

In this step, a solution obtained by dissolving silicon oxide in water and/or an organic solvent is continuously or intermittently added to the reaction solution containing fine nuclear particles to carry out the reaction on the surface of fine nuclear particles. It is preferable to add over 0.1 to 100 hours. When it exceeds 100 hours, it is not economically efficient. When it is less than 0.1 hour, there is a possibility that the reaction might not be fully completed.

The reaction temperature is not particularly restricted, but it is preferably from 0 to 200 degrees centigrade and more preferably from 80 to 200 degrees centigrade. When the reaction temperature exceeds 200 degrees centigrade, there is a possibility to cause agglomeration of fine particles. When the reaction temperature is less than 0 degree centigrade, there is a possibility not to proceed with the reaction fully.

Incidentally, other inorganic oxide contained in the coating layer (B), that is, a coating layer containing silicon oxide is not particularly restricted as long as it does not impair light resistance, dispersibility and storage stability of fine particles to be obtained. Concrete examples thereof include oxides of Al, Si, V, Fe, Zn, Zr, Nb, Mo, Sn, Sb, W and the like. Preferably used are oxides of Al, Si, Zr, Sn and Sb.

Furthermore, as the coating layer, preferably used is only a coating layer composed of the aforementioned two-layered silicon oxide, but a coating layer composed of other inorganic oxide may also be arranged. In this case, it is preferable to arrange it on an inner side of the coating layer composed of the aforementioned two-layered silicon oxide.

In ultrafine particles coated with an inorganic oxide, i.e., ultrafine particles of a tin-modified rutile-type titanium oxide coated with a two-layered silicon oxide obtained according to the present invention, a short axis and a long axis of a crystal grain diameter thereof have a length of preferably from 2 to 20 nm, and an average agglomerated particle diameter is preferably from 10 to 100 nm. When the crystal grain diameter is less than 2 nm, there is a possibility that a refractive index to be inherently obtained might not be obtained. When the diameter is greater than 20 nm, there is a possibility to cause light scattering. When the average agglomerated particle diameter is greater than 100 nm, there is a possibility that the sol or the obtained resin composition is whitened so that it might become opaque.

The weight ratio of the silicon oxide coating layer to fine nuclear particles obtained by the above method is from 0.001 to 20 in terms of $SiO_2$. Depending on the amount of the coating layer, the refractive index and light resistance of the ultrafine particle itself can be controlled. Accordingly, desired light resistance can be imparted, and the refractive index can be adjusted in the range of 1.5 to 2.8.

The reaction product obtained as described above may be used as a sol containing ultrafine particles of a tin-modified rutile-type titanium oxide coated with a two-layered silicon oxide as it is, or may be subjected to a desired post-treatment. That is, vacuum concentration using an evaporator, purification according to a known method such as ultrafiltration or the like, or concentration to an appropriate concentration can also be carried out. Also, a white precipitate can be obtained by centrifugal separation and then can be re-dispersed in water or other desired organic solvent. In particular, by carrying out ultrafiltration, it is possible to remove an ionic portion, which shield the electric double layer around fine particles, causing agglomeration of fine particles so that the dispersion stability is enhanced. A sol containing ultrafine particles of a tin-modified rutile-type titanium oxide coated with a two-layered silicon oxide which are dispersed in water can also be used as a sol containing ultrafine particles which are dispersed in an organic solvent by using solvent substitution to an organic solvent such as alcohols including methanol and the like, and cellosolves including 2-methoxyethanol and the like.

The ultrafine particle of titanium oxide is a sol which usually has an isopotential point in a neutral region and a sol thereof is stable in an acidic region in a conventional production method. Since a sol containing ultrafine particles of titanium oxide prepared in a conventional method causes agglomeration and gelation in a neutral to basic region, there has been a problem of restriction on the usage range. Further, when substitution to an organic solvent is performed, there has been a problem of deterioration of stability due to agglomeration and gelation caused by the sol. Furthermore, when the sol is concentrated to not less than 10 weight % in the case of using water as the dispersion medium, gelation may occurs. That is, there have been problems such that it is difficult to obtain a sol which is dispersed in a high concentration and the productivity is low. By reacting silicon oxide according to the present invention in the range of a pH of less than 7 (pH<7), a sol of ultrafine particles of titanium oxide coated with a thin-layered silicon oxide excellent in the dispersibility and storage stability is obtained without causing agglomeration and gelation under the condition of a wide range of a pH, particularly more than 3 and less than 14 (14>pH>3). Furthermore, by reacting in the pH range of not less than 7 (pH≥7), it is possible to arrange a densely thick silicon oxide coating layer on titanium oxide ultrafine particles.

In the sol of titanium oxide ultrafine particles which is usually stable in an acidic region, the surface of titanium oxide ultrafine particles is positively charged. By selecting ultrafine particles having electrical charges with different signs by the reaction under the above conditions and having a size smaller than that of fine nuclear particles, hetero-agglomeration occurs on the surface of fine nuclear particles, and a thin-layered silicon oxide coating film is uniformly formed with better efficiency. Accordingly, it is assumed that properties of $SiO_2$ are imparted to the surface of fine nuclear particles, the sol containing ultrafine particles of titanium oxide in the present invention is stable in a wide pH range of from 3 to 14. The densely thick silicon oxide layer is grown under basic conditions of a pH of not less than 7 (pH≥7), whereby ultrafine particles having light resistance and weather resistance while maintaining high dispersibility are obtained. That is, the sol containing ultrafine particles of titanium oxide contains ultrafine particles of titanium oxide excellent in transparency, dispersibility, storage stability, light resistance, weather resistance and the like which have a two-layered structure consisting of an inner coating layer formed under a pH of less than 7 (pH<7) and an outer coating layer formed under a pH of not less than 7 (pH≥7).

Even when the sol is prepared in a high concentration of not less than 20 weight % and further not less than 35 weight % in terms of the solid content by the aforementioned silicon oxide coating, the sol is stably present in a wide range of the pH by coating silicone oxide. Even when solvent substitution to an organic solvent is performed, the sol is stably present in a high concentration.

According to this method, there are obtained coating inorganic oxide ultrafine particles, i.e., ultrafine particles of a tin-modified rutile-type titanium oxide coated with a two-layered silicon oxide in which a short axis and a long axis of a crystal grain diameter have a length of 2 to 20 nm, and an average agglomerated particle diameter is from 10 to 100 nm. When the crystal grain diameter is less than 2 nm, there is a possibility that a refractive index to be inherently obtained might not be obtained when a dispersion medium containing these ultrafine particles is used for a resin composition. When the diameter is greater than 20 nm, there is a possibility to cause light scattering. When the average agglomerated particle diameter is greater than 100 nm, there is a possibility that the obtained resin composition is whitened so that it might become opaque.

The organic solvent (dispersion medium) used for dispersing ultrafine particles in the present invention is not particularly restricted. Concrete examples thereof include organic solvents including alcohols such as methanol, ethanol, isopropanol and the like; glycol ethers such as methyl cellosolve, ethyl cellosolve, propylene glycol monomethyl ether and the like; esters such as ethyl acetate and the like; ethers such as tetrahydrofuran and the like; ketones such as acetone, methyl ethyl ketone, methyl isobutyl ketone and the like; halogen hydrocarbons such as chloroform and the like; and hydrocarbons such as toluene, heptane and the like. The organic solvents may be used in combination of two or more kinds.

The refractive index of ultrafine particles of a coating inorganic oxide obtained according to the above method, i.e., ultrafine particles of a tin-modified rutile-type titanium oxide coated with a two-layered silicon oxide is from 1.5 to 2.8, particularly from 2.0 to 2.8, and is properly set depending on various uses.

Accordingly, fine particles of a coating inorganic oxide according to the present invention, i.e., fine particles of a tin-modified rutile-type titanium oxide coated with a two-layered silicon oxide have a high refractive index, and are excellent in transparency, dispersibility, light resistance, weather resistance and the like. So, the resin composition formed by using the fine particles combines high refraction index, transparency, light resistance, weather resistance, heat resistance, formation processability and the like, and is capable of controlling the refractive index freely, and has been suitably used for an optical member.

Next, an organic material is bonded to the surface of metal fine particles obtained as described above to prepare organically modified fine particles.

Incidentally, ultrafine particles of a tin-modified rutile-type titanium oxide obtained in accordance with the aforementioned method or ultrafine particles of a tin-modified rutile-type titanium oxide coated with a two-layered silicon oxide are exemplified as metal fine particles in the following.

The surface of ultrafine particles of a tin-modified rutile-type titanium oxide or ultrafine particles of a tin-modified rutile-type titanium oxide coated with a two-layered silicon oxide is modified, coated or reformed with an organic material, whereby it is possible to synthesize organically modified fine particles used in the present invention.

Examples of the method for organic modification on the surface of metal fine particles include a silane coupling method, a high-temperature and high-pressure method and the like. Among these methods, preferably used is a high-temperature and high-pressure method, and more preferably used is synthesis and modification in water in the subcritical state or supercritical state.

An apparatus used in the high-temperature and high-pressure method is not particularly restricted as long as high-temperature and high-pressure conditions are satisfied, and examples thereof include a flow-type apparatus, a batch-type autoclave and the like.

First, a dispersion solution containing fine particles, one or more molecule for organic modifying and distilled water are put into a reaction vessel and the resultant vessel is sealed. The inside of the reaction vessel is heated under conditions of a temperature of 200 to 500 degrees centigrade and a pressure of 5 to 50 MPa, and water in the supercritical state or subcritical state is used as a reaction field for the reaction, whereby it is possible to synthesize organically surface-modified fine particles of 1 to 100 nm.

The mixture obtained after the reaction is dispersed in an organic solvent and/or distilled water, and an operation such as washing, solution separation, re-precipitation, centrifugal separation, decantation, filtration, concentration or the like is carried out, whereby it is possible to isolate organically modified fine particles. Depending on the kind of the molecule for organic modifying, it is possible to obtain organically modified fine particles in a powder form or oil form.

As an additive for optical materials, isolated organically modified fine particles may be used as they are, a prescribed additive may be added to the isolated organically modified fine particles, or a mixture obtained after the reaction may be used as it is.

The kind of the dispersion solution containing fine particles in use is not particularly restricted, but examples thereof include a water sol, and a sol which is dispersed in an organic solvent by obtaining solvent substitution to an organic solvent such as alcohols including methanol and the like, and cellosolves including 2-methoxyethanol and the like.

As the molecule for organic modifying in use, there can be used an organic material as described in "(I) Production method of organically modified fine particles by carrying out synthesis of fine particles and organic modification at the same time".

The number of carbon atoms of the above molecule for organic modifying is preferably not less than 2 and more preferably not less than 6. The molecule for organic modifying may have a double bond and/or a benzene ring in a molecule, and a hydrogen atom may be substituted with a halogen atom or may not be substituted.

The organic solvent to be used after the reaction is not particularly restricted. In general, as an organic solvent used for washing or solution separation, preferably used is an organic solvent miscible with the molecule for organic modifying in use, while, as an organic solvent used for re-precipitation, preferably used is an organic solvent which is not miscible with the molecule for organic modifying in use.

The resin composition according to the present invention can be produced according to the following method from the viewpoint of uniformly mixing organically modified fine particles with the resin.

Concrete examples thereof include:

(a) a method including each independently preparing a resin component and a sol containing organically modified fine particles or an organically modified fine particle powder, and then mixing or kneading both of them together, (b) a method including polymerizing a polymerizable compound in the presence of previously prepared organically modified fine particles to generate a polymer, (c) a method for preparing organically modified fine particles in the presence of the previously prepared resin component and the like.

Of the above method (a), preferably used is a method for obtaining a resin composition by uniformly mixing a sol containing organically modified fine particles and a solution obtained by dissolving a resin component, and removing a solvent.

From the viewpoint of the dispersion stability of organically modified fine particles, preferably used are the above methods (a) and (b), and more preferably used is the above method (b).

Resin Component and Polymer Obtained from Polymerizable Compound

The resin component and the polymer used in the present invention will be described. Incidentally, a polymer contained in a transparent member obtained from the resin composition will be additionally illustrated hereinafter.

A resin for optical materials requires properties such as colorlessness and transparency, and small birefringence; low hygroscopicity not to cause moisture absorption and deformation; high heat resistance in the production step or under the environment of use; excellent moldability and the like. The resin is not particularly restricted as long as these requirements are satisfied, and examples thereof include those used for a conventional optical lens (a spectacle lens, a Fresnel lens, a pickup lens in information recording devices such as CD, DVD and the like, a lens for cameras such as a digital camera and the like), an optical prism, an optical waveguide, an optical fiber, a thin-film molded product, an adhesive for optical uses, a sealing material for optical semiconductors, a diffraction grating, a light guiding plate, a liquid crystal substrate, a light reflection plate and the like.

For example, suitably used are amorphous thermoplastic resins having typical examples of an acrylic based resin, a styrene based resin, a polycarbonate resin, a polyester resin, an olefin based resin, an alicyclic acrylic resin, an alicyclic olefin resin, a polyurethane resin, a polyether resin, a polyamide resin and a polyimide resin, and curable resins such as an epoxy resin, an unsaturated polyester resin and the like.

Concrete examples of the acrylic based resin include methyl methacrylate (PMMA) and the like. Examples of the styrene based resin include polystyrene (PS), styrene-acrylonitrile copolymer (SAN), styrene-methyl methacrylate copolymer and the like. Examples of the polyester resin include polyethylene terephthalate, polyethylene naphthalate and the like. Examples of the olefin based resin include cyclic olefin copolymer, polymethylpentene (TPX (registered trademark)) and the like.

The polycarbonate resin is a polymer produced by the reaction of bisphenols with carbonic esters such as phosgene or the like. The alicyclic acrylic resin is an acrylic based resin obtained by introducing an aliphatic cyclic hydrocarbon such as tricyclodecane or the like into an ester substituent group, and examples thereof include tricyclodecane polymethacrylate, norbornane polymethacrylate and the like. These resins have excellent low birefringence, low hygroscopicity and heat resistance, and have been used for pickup lenses, imaging lenses and the like. The alicyclic olefin resin is obtained by introducing a sterically rigid alicyclic group into a main chain of an olefin based polymer, has excellent heat resistance and low hygroscopicity, and has been used for a lens of a mounting CD player or the like.

There can also be cited a polymer with a benzene ring, an aliphatic ring or the like bonded thereto through an ether bond, such as a polyether resin, a polyamide resin, a polyimide resin and the like.

Further, a resin obtained by polymerizing a monomer containing an element having a large atomic number such as sulfur, halogen or the like, for example, a resin obtained by forming a thiourethane bond by subjecting a thiol compound and an isocyanate compound used for a spectacle lens to thermal polymerization, a resin obtained by subjecting an episulfide or epithiosulfide compound to polymerizing/curing and the like can also be used.

Furthermore, for use in a semiconductor sealing agent, a thermosetting epoxy resin, a silicon resin and the like are suitably used.

Next, as a polymer obtained from the polymerizable compound, one or more kinds can be selected from the group consisting of an episulfide resin, a thiourethane resin, an acrylic resin and an allyl diglycol carbonate resin. Hereinafter, a resin composition which enables to form a transparent member containing such a resin will be illustrated.

As the episulfide resin composition, there can be used a polymerizable composition containing a polymerizable compound (a) having an episulfide group and the aforementioned organically modified fine particles.

Concrete examples of the episulfide compound (a) to be used as a raw material of the episulfide resin include epithioethyl compounds such as bis(1,2-epithioethyl)sulfide, bis(1,2-epithioethyl)disulfide, bis(epithioethyl)methane, bis(epithioethyl)benzene, bis{4-(epithioethyl)phenyl}sulfide, bis{4-(epithioethyl)phenyl}methane and the like; chained aliphatic 2,3-epithiopropylthio compounds such as bis(2,3-epithiopropyl)sulfide, bis(2,3-epithiopropyl)disulfide, bis(2,3-epithiopropylthio)methane, 1,2-bis(2,3-epithiopropylthio)ethane, 1,2-bis(2,3-epithiopropylthio)propane, 1,3-bis(2,3-epithiopropylthio)propane, 1,3-bis(2,3-epithiopropylthio)-2-methylpropane, 1,4-bis(2,3-epithiopropylthio)butane, 1,4-bis(2,3-epithiopropylthio)-2-methylbutane, 1,3-bis(2,3-epithiopropylthio)butane, 1,5-bis(2,3-epithiopropylthio)pentane, 1,5-bis(2,3-epithiopropylthio)-2-methylpentane, 1,5-bis(2,3-epithiopropylthio)-3-thiapentane, 1,6-bis(2,3-epithiopropylthio)hexane, 1,6-bis(2,3-epithiopropylthio)-2-methylhexane, 3,8-bis(2,3-epithiopropylthio)-3,6-dithiaoctane, 1,2,3-tris(2,3-epithiopropylthio)propane, 2,2-bis(2,3-epithiopropylthio)-1,3-bis(2,3-epithiopropylthiome thyl)propane, 2,2-bis(2,3-epithiopropylthiomethyl)-1-(2,3-epithiopropylthio) butane, 1,5-bis(2,3-epithiopropylthio)-2-(2,3-epithiopropylthiomethyl)-3-thiapentane, 1,5-bis(2,3-epithiopropylthio)-2,4-bis(2,3-epithiopropylthio thyl)-3-thiapentane, 1-(2,3-epithiopropylthio)-2,2-bis(2,3-epithiopropylthiomethyl)-4-thiahexane, 1,5,6-tris(2,3-epithiopropylthio)-4-(2,3-epithiopropylthiometh yl)-3-thiahexane, 1,8-bis(2,3-epithiopropylthio)-4-(2,3-epithiopropylthiomethyl)-3,6-dithiaoctane, 1,8-bis(2,3-epithiopropylthio)-4,5-bis(2,3-epithiopropylthiome thyl)-3,6-dithiaoctane, 1,8-bis(2,3-epithiopropylthio)-4,4-bis(2,3-epithiopropylthiome thyl)-3,6-dithiaoctane, 1,8-bis(2,3-epithiopropylthio)-2,5-bis(2,3-epithiopropylthiome thyl)-3,6-dithiaoctane, 1,8-bis(2,3-epithiopropylthio)-2,4,5-tris(2,3-epithiopropylthi omethyl)-3,6-dithiaoctane, 1,1,1-tris[{2-(2,3-epithiopropylthio)ethyl}thiomethyl]-2-(2,3-epithiopropylthio)ethane, 1,1,2,2-tetrakis[{2-(2,3-epithiopropylthio)ethyl}thiomethyl]et hane, 1,11-bis(2,3-epithiopropylthio)-4,8-bis(2,3-epithiopropylthiom ethyl)-3,6,9-trithiaundecane, 1,11-bis(2,3-epithiopropylthio)-4,7-bis (2,3-epithiopropylthiom ethyl)-3,6,9-trithiaundecane, 1,11-bis(2,3-epithiopropylthio)-5,7-bis(2,3-epithiopropylthiom ethyl)-3,6,9-trithiaundecane and the like; cyclic aliphatic 2,3-epithiopropylthio compounds such as 1,3-bis(2,3-epithiopropylthio)cyclohexane, 1,4-bis(2,3-epithiopropylthio)cyclohexane, 1,3-bis(2,3-epithiopropylthiomethyl)cyclohexane, 1,4-bis(2,3-epithiopropylthiomethyl)cyclohexane, 2,5-bis(2,3-epithiopropylthiomethyl)-1,4-dithiane, 2,5-bis[{2-(2,3-epithiopropylthio)ethyl}thiomethyl]-1,4-dithia ne, 2,5-bis(2,3-epithiopropylthiomethyl)-2,5-dimethyl-1,4-dithiane and the like; aromatic 2,3-epithiopropylthio compounds such as 1,2-bis(2,3-epithiopropylthio)benzene, 1,3-bis(2,3-epithiopropylthio)benzene, 1,4-bis(2,3-epithiopropylthio)benzene, 1,2-bis(2,3-epithiopropylthiomethyl)benzene, 1,3-bis(2,3-epithiopropylthiomethyl)benzene, 1,4-bis(2,3-epithiopropylthiomethyl)benzene, bis{4-(2,3-epithiopropylthio)phenyl}methane, 2,2-bis{4-(2,3-epithiopropylthio)phenyl}propane, bis{4-(2,3-epithiopropylthio)phenyl}sulfide, bis{4-(2,3-epithiopropylthio)phenyl}sulfone, 4,4'-bis(2,3-epithiopropylthio)biphenyl and the like; monofunctional episulfide compounds such as ethylene sulfide, propylene sulfide, mercaptopropylene sulfide, mercaptobutene sulfide, epithiochlorohydrin and the like; chained aliphatic 2,3-epithiopropyloxy compounds such as bis(2,3-epithiopropyl)ether, bis(2,3-epithiopropyloxy)methane, 1,2-bis(2,3-epithiopropyloxy)ethane, 1,2-bis(2,3-epithiopropyloxy)propane, 1,3-bis(2,3-epithiopropyloxy)propane, 1,3-bis(2,3-epithiopropyloxy)-2-methylpropane, 1,4-bis(2,3-epithiopropyloxy)butane, 1,4-bis(2,3-epithiopropyloxy)-2-methylbutane, 1,3-bis(2,3-epithiopropyloxy)butane, 1,5-bis(2,3-epithiopropyloxy)pentane, 1,5-bis(2,3-epithiopropyloxy)-2-methylpentane, 1,5-bis(2,3-epithiopropyloxy)-3-thiapentane, 1,6-bis(2,3-epithiopropyloxy)hexane, 1,6-bis(2,3-epithiopropyloxy)-2-methylhexane, 3,8-bis(2,3-epithiopropyloxy)-3,6-dithiaoctane, 1,2,3-tris(2,3-epithiopropyloxy)propane, 2,2-bis(2,3-epithiopropyloxy)-1,3-bis(2,3-epithiopropyloxymeth yl)propane, 2,2-bis(2,3-epithiopropyloxymethyl)-1-(2,3-epithiopropyloxy)bu tane, 1,5-bis(2,3-epithiopropyloxy)-2-(2,3-epithiopropyloxymethyl)-3-thiapentane, 1,5-bis(2,3-epithiopropyloxy)-2,4-bis(2,3-epithiopropyloxymeth yl)-3-thiapentane, 1-(2,3-epithiopropyloxy)-2,2-bis(2,3-epithiopropyloxymethyl)-4-thiahexane, 1,5,6-tris(2,3-epithiopropyloxy)-4-(2,3-epithiopropyloxymethyl-3-thiahexane, 1,8-bis(2,3-epithiopropyloxy)-4-(2,3-epithiopropyloxymethyl)-3,6-dithiaoctane, 1,8-bis(2,3-epithiopropyloxy)-4,5-bis(2,3-epithiopropyloxymeth yl)-3,6-dithiaoctane, 1,8-bis(2,3-epithiopropyloxy)-4,4-bis(2,3-epithiopropyloxymeth yl)-3,6-dithiaoctane, 1,8-bis(2,3-epithiopropyloxy)-2,5-bis(2,3-epithiopropyloxymeth yl)-3,6-dithiaoctane, 1,8-bis(2,3-epithiopropyloxy)-2,4,5-tris(2,3-epithiopropyloxym ethyl)-

3,6-dithiaoctane, 1,1,1-tris[{2-(2,3-epithiopropyloxy)ethyl}thiomethyl]-2-(2,3-epithiopropyloxy)ethane, 1,1,2,2-tetrakis[{2-(2,3-epithiopropyloxy)ethyl}thiomethyl]ethane, 1,11-bis(2,3-epithiopropyloxy)-4,8-bis(2,3-epithiopropyloxymethyl)-3,6,9-trithiaundecane, 1,11-bis(2,3-epithiopropyloxy)-4,7-bis(2,3-epithiopropyloxymethyl)-3,6,9-trithiaundecane, 1,11-bis(2,3-epithiopropyloxy)-5,7-bis(2,3-epithiopropyloxymethyl)-3,6,9-trithiaundecane and the like; cyclic aliphatic 2,3-epithiopropyloxy compounds such as 1,3-bis(2,3-epithiopropyloxy)cyclohexane, 1,4-bis(2,3-epithiopropyloxy)cyclohexane, 1,3-bis(2,3-epithiopropyloxymethyl)cyclohexane, 1,4-bis(2,3-epithiopropyloxymethyl)cyclohexane, 2,5-bis(2,3-epithiopropyloxymethyl)-1,4-dithiane, 2,5-bis[{2-(2,3-epithiopropyloxy)ethyl}thiomethyl]-1,4-dithiane, 2,5-bis(2,3-epithiopropyloxymethyl)-2,5-dimethyl-1,4-dithiane and the like; and aromatic 2,3-epithiopropyloxy compounds such as 1,2-bis(2,3-epithiopropyloxy)benzene, 1,3-bis(2,3-epithiopropyloxy)benzene, 1,4-bis(2,3-epithiopropyloxy)benzene, 1,2-bis(2,3-epithiopropyloxymethyl)benzene, 1,3-bis(2,3-epithiopropyloxymethyl)benzene, 1,4-bis(2,3-epithiopropyloxymethyl)benzene, bis{4-(2,3-epithiopropyloxy)phenyl}methane, 2,2-bis{4-(2,3-epithiopropyloxy)phenyl}propane, bis{4-(2,3-epithiopropyloxy)phenyl}sulfide, bis{4-(2,3-epithiopropyloxy)phenyl}sulfone, 4,4'-bis(2,3-epithiopropyloxy)biphenyl and the like, but are not restricted to these exemplified compounds alone. Of these exemplified compounds, preferable compounds are bis(1,2-epithioethyl)sulfide, bis(1,2-epithioethyl)disulfide, bis(2,3-epithiopropyl)sulfide, bis(2,3-epithiopropylthio)methane and bis(2,3-epithiopropyl)disulfide, and more preferable compounds are bis(1,2-epithioethyl)sulfide, bis(1,2-epithioethyl)disulfide, bis(2,3-epithiopropyl)disulfide and bis(2,3-epithiopropyl)sulfide.

As the thiourethane resin composition, there can be used a polymerizable composition containing a polythiol compound (b) and iso(thio)cyanate compounds (c) as a polymerizable compound, and the aforementioned organically modified fine particles.

Preferable concrete examples of the polythiol compound (b) to be used as a raw material of the thiourethane resin include aliphatic polythiol compounds such as 1,1-methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, thiomalic acid bis(2-mercaptoethyl ester), 2,3-dimercapto-1-propanol (2-mercaptoacetate), 2,3-dimercapto-1-propanol (3-mercaptopropionate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), trimethylolpropane bis(2-mercaptoacetate), trimethylolpropane bis(3-mercaptopropionate), pentaerythritol tetrakis(2-mercaptoacetate), pentaerythritol tetrakis(3-mercaptopropionate), tetrakis(mercaptomethyl)methane and the like; aromatic polythiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane and the like; polythiols each containing a hetero ring such as 2-methylamino-4,6-dithiol-sym-triazine and the like; aromatic polythiol compounds each containing a sulfur atom other than the mercapto group such as 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene and nucleus-alkylated compounds of these compounds; aliphatic polythiol compounds each containing a sulfur atom other than the mercapto group such as bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropyl)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 1,2-bis[(2-mercaptoethyl)thio]-3-mercaptopropane, 4,8-dimercaptomethyl-1,11-mercapto-3,6,9-trithiaundecane, 4,7-dimercaptomethyl-1,11-mercapto-3,6,9-trithiaundecane, 5,7-dimercaptomethyl-1,11-mercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, bis(1,3-dimercaptopropyl)sulfide, 2,5-dimercapto-1,4-dithiane, 2,5-dimercaptomethyl-1,4-dithiane, 2,5-dimercaptomethyl-2,5-dimethyl-1,4-dithiane, bis(mercaptomethyl)disulfide, bis(mercaptoethyl)disulfide, bis(mercaptopropyl)disulfide, thioglycolic acid or mercaptopropionic acid esters of these compounds, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithiane-2,5-diol bis(2-mercaptoacetate), 1,4-dithiane-2,5-diol bis(3-mercaptopropionate), thiodiglycolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thiodiglycolic acid bis(2,3-dimercaptopropyl ester), thiodipropionic acid bis(2,3-dimercaptopropyl ester), dithioglycolic acid bis(2,3-dimercaptopropyl ester), dithiodipropionic acid bis(2,3- dimercaptopropyl ester) and the like; and heterocyclic compounds containing a sulfur atom other than the mercapto group such as 3,4-thiophenedithiol, 2,5-dimercapto-1,3,4-thiadiazole and the like, but are not restricted to these exemplified compounds alone. Furthermore, halogen substitution products such as chlorine substitution products, bromine substitution products and the like of these polythiol compounds may also be used. These compounds may be singly used or in combination of two or more kinds. Further, examples of the mercapto compound having a hydroxy group include 2-mercaptoethanol, 3-mercapto-1,2-propanediol, glycerine di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), dipentaerythritol pentakis(3-mercaptopropionate), hydroxymethyl-tris(mercaptoethylthiomethyl)methane, 1-hydroxyethylthio-3-mercaptoethylthiobenzene and the like, but are not restricted to these exemplified compounds. Furthermore, halogen substitution products such as chlorine substitution products, bromine substitution products and the like thereof may also be used.

Concrete examples of the iso(thio)cyanate compound (c) to be used as a raw material of the thiourethane resin include aliphatic polyisocyanate compounds such as hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecanetriisocyanate, 1,3,6-hexamethylene triisocyanate, 1,8-diisocyanato-4-isocyanatomethyloctane, bis(isocyanatoethyl)carbonate, bis(isocyanatoethyl)ether, lysine diisocyanatomethyl ester, lysine triisocyanate, xylylene diisocyanate, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethyl)diphenyl ether, bis(isocyanatoethyl)phthalate, mesitylene triisocyanate, 2,6-di(isocyanatomethyl)furan and the like; alicyclic polyisocyanate compounds such as isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2-dimethyldicyclohexylmethane diisocyanate, 2,5-bis(isocyanatomethyl)bicyclo-[2,2,1]-heptane, 2,6-bis(isocyanatomethyl)bicyclo-[2,2,1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane and the like; aromatic polyisocyanate compounds such as phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, tolidine diisocyanate, 4,4-diphenylmethane diisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, phenylisocyanatoethyl isocyanate, hexahydrobenzene diisocyanate, hexahydrodiphenylmethane-4,4-diisocyanate and the like; sulfur-containing aliphatic isocyanate compounds such as bis(isocyanatomethyl)sulfide, bis(isocyanatoethyl)sulfide, bis(isocyanatopropyl)sulfide, bis(isocyanatohexyl)sulfide, bis(isocyanatomethyl)sulfone, bis(isocyanatomethyl)disulfide, bis(isocyanatoethyl)disulfide, bis(isocyanatopropyl)disulfide, bis(isocyanatomethylthio)methane, bis(isocyanatoethylthio)methane, bis(isocyanatoethylthio)ethane, bis(isocyanatomethylthio)ethane, 1,5-diisocyanato-2-isocyanatomethyl-3-thiapentane and the like; aromatic sulfide based isocyanate compounds such as diphenylsulfide-2,4-diisocyanate, diphenylsulfide-4,4-diisocyanate, 3,3-dimethoxy-4,4-diisocyanatodibenzylthioether, bis(4-isocyanatomethylbenzene)sulfide, 4,4-methoxybenzene thioethylene glycol-3,3-diisocyanate and the like; aromatic disulfide based isocyanate compounds such as diphenyldisulfide-4,4-diisocyanate, 2,2-dimethyldiphenyl disulfide-5,5-diisocyanate, 3,3-dimethyldiphenyl disulfide-5,5-diisocyanate, 3,3-dimethyldiphenyl disulfide-6,6-diisocyanate, 4,4-dimethyldiphenyl disulfide-5,5-diisocyanate, 3,3-dimethoxydiphenyl disulfide-4,4-diisocyanate, 4,4-dimethoxydiphenyl disulfide-3,3-diisocyanate and the like; and sulfur-containing heterocyclic compounds such as 2,5-diisocyanatothiophene, 2,5-bis(isocyanatomethyl)thiophene and the like. Other examples include 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, 4,5-bis(isooyanatomethyl)-2-methyl-1,3-dithiolane and the like. However, the isocyanate compounds are not restricted to these exemplified compounds. Furthermore, these compounds may be substituted with halogen such as chlorine, bromine or the like, alkyl, alkoxy, or nitro. Moreover, these compounds may be modified with polyalcohol (prepolymer type), carbodiimide, urea or biuret. Dimer or trimer reaction products of these compounds can also be used.

Further, concrete examples of the isothiocyanate compound include monofunctional isothiocyanate compounds such as methyl isothiocyanate, ethyl isothiocyanate, n-propyl isothiocyanate, isopropyl isothiocyanate, n-butyl isothiocyanate, sec-butyl isothiocyanate, tert-butyl isothiocyanate, pentyl isothiocyanate, hexyl isothiocyanate, heptyl isothiocyanate, octyl isothiocyanate, decyl isothiocyanate, lauryl isothiocyanate, myristyl isothiocyanate, octadecyl isothiocyanate, 3-pentyl isothiocyanate, 2-ethylhexyl isothiocyanate, 2,3-dimethylcyclohexyl isothiocyanate, 2-methoxyphenyl isothiocyanate, 4-methoxyphenyl isothiocyanate, α-methylbenzyl isothiocyanate, phenylethyl isothiocyanate, phenyl isothiocyanate, o-, m- or p-tolyl isothiocyanate, cyclohexyl isothiocyanate, benzyl isothiocyanate, isothiocyanatomethylbicycloheptane and the like; aliphatic polyisothiocyanate compounds such as 1,6-diisothiocyanatohexane, p-phenyleneisopropylidene diisothiocyanate and the like; alicyclic polyisothiocyanate compounds such as cyclohexane diisothiocyanate, diisothiocyanatomethylbicycloheptane and the like; aromatic isothiocyanate compounds such as 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4-diisothiocyanato-1,1-biphenyl, 1,1-methylene bis(4-isothiocyanatobenzene), 1,1-methylene bis(4-isothiocyanato-2-methylbenzene), 1,1-methylene bis(4-isothiocyanato-3-methylbenzene), 1,1-(1,2-ethanediyl)bis(isothiocyanatobenzene), 4,4-diisothiocyanatobenzophenone, 4,4-diisothiocyanato-3,3-dimethylbenzophenone, diphenyl ether-4,4-diisothiocyanate, diphenylamine-4,4-diisothiocyanate and the like; and carbonyl isothiocyanate compounds such as 1,3-benzenedicarbonyl diisothiocyanate, 1,4-benzenedicarbonyl diisothiocyanate, (2,2-pyridine)-4,4-dicarbonyl diisothiocyanate and the like, but are not restricted to these exemplified compounds.

Meanwhile, concrete examples of the isothiocyanate compound containing one or more sulfur atoms in addition to the isothiocyanato group include sulfur-containing aliphatic isothiocyanate compounds such as thiobis(3-isothiocyanatopropane), thiobis(2-isothiocyanatoethane), dithiobis(2-isothiocyanatoethane) and the like; sulfur-containing aromatic isothiocyanate compounds such as 1-isothiocyanato-4-[(2-isothiocyanato)sulfonyl]benzene, thiobis(4-isothiocyanatobenzene), sulfonyl bis(4-isothiocyanatobenzene), dithiobis(4-isothiocyanatobenzene) and the like; and sulfur-containing heterocyclic compounds such as 2,5-diisothiocyanatothiophene, 2,5-diisothiocyanato-1,4-dithiane and the like, but are not restricted to these exemplified compounds. Furthermore, these compounds may be substituted with halogen such as chlorine, bromine or the like, alkyl, alkoxy, or nitro. Moreover, these compounds may be modified with polyalcohol (prepolymer type), carbodiimide, urea or biuret. Dimer or trimer reaction products of these compounds can also be used. Furthermore, examples thereof include isothiocyanate compounds each having an isocyanate group. Examples thereof include aliphatic and alicyclic compounds such as 1-isocyanato-6-isothiocyanatohexane, 1-isocyanato-4-isothiocyanatocyclohexane and the like; aromatic compounds such as 1-isocyanato-4-isothiocyanatobenzene, 4-methyl-3-isocyanato-1-isothiocyanatobenzene and the like; heterocyclic compounds such as 2-isocyanato-4,6-diisothiocyanato-1,3,5-triazine and the like; and compounds each having a sulfur atom other than the isothiocyanato group such as 4-isocyanato-4'-isothiocyanatodiphenyl sulfide, 2-isocyanato-2'-isothiocyanato diethyl disulfide and the like, but are not restricted to these exemplified compounds. Furthermore, these compounds may be substituted with halogen such as chlorine, bromine or the like, alkyl, alkoxy, or nitro. Moreover, these compounds may be modified with polyalcohol (prepolymer type), carbodiimide, urea or biuret. Dimer or trimer reaction products of these compounds can also be used.

As the acrylic resin composition, a polymerizable composition containing the olefin compound (d) as a polymerizable compound and the aforementioned organically modified fine particles can be used.

Preferable concrete examples of the olefin compound (d) to be used as a raw material of the acrylic resin include (meth)acrylate compounds such as benzyl acrylate, benzyl methacrylate, butoxyethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, neopentyl glycol dimethacrylate, ethylene glycol bisglycidyl acrylate, ethylene glycol bisglycidyl methacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, dimethyloltricyclodecane diacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methyl thioacrylate, methyl thiomethacrylate, phenyl thioacrylate, benzyl thiomethacrylate, xylylenedithiol diacrylate, xylylenedithiol dimethacrylate, mercaptoethyl sulfide diacrylate, mercaptoethyl sulfide dimethacrylate and the like; allyl compounds such as allyl glycidyl ether, diallyl phthalate, diallyl terephthalate, diallyl isophthalate, diallyl carbonate, diethylene glycol bisallyl carbonate and the like; vinyl compounds such as styrene, chlorostyrene, methylstyrene, bromostyrene, dibromostyrene, divinylbenzene, 3,9-divinyl spirobi(m-dioxane), divinyl sulfide, divinyl disulfide and the like; and diisopropenyl benzene, but are not restricted to these exemplified compounds alone.

As the allyl diglycol carbonate resin composition, there can be used a polymerizable composition containing a diallyl carbonate compound (e) as a polymerizable compound and the aforementioned organically modified fine particles.

Concrete examples of the diallyl carbonate compound (e) to be used as a raw material of the allyl diglycol carbonate resin include ethylene glycol bisallyl carbonate, diethylene glycol bisallyl carbonate, triethylene glycol bisallyl carbonate, tetraethylene glycol bisallyl carbonate, pentaethylene glycol bisallyl carbonate, propylene glycol bisallyl carbonate, polypropylene glycol bisallyl carbonate and the like, but are not restricted to these exemplified compounds alone.

The aforementioned polymerizable compounds (a) to (e) may be used singly or in combination of two or more kinds selected from respective aforementioned exemplified compounds.

The organically modified fine particles to be used in the present invention may be used singly or in combination. Furthermore, other inorganic oxide fine particles can also be used together in the ranges in which the effect of the present invention is not impaired. Examples thereof include colloidal silica, colloidal antimony oxide and the like.

Meanwhile, when organically modified fine particles are used as a sol, the organic solvent (dispersion medium) to be used for dispersing ultrafine particles is not particularly restricted. Concrete examples thereof include organic solvents including alcohols such as methanol, ethanol, isopropanol and the like; glycol ethers such as methyl cellosolve, ethyl cellosolve, propylene glycol monomethyl ether and the like; esters such as ethyl acetate and the like; ethers such as tetrahydrofuran and the like; ketones such as acetone, methyl ethyl ketone, methyl isobutyl ketone and the like; halogen hydrocarbons such as chloroform and the like; and hydrocarbons such as toluene, heptane and the like. Two or more kinds thereof may be used in combination.

Furthermore, using an organic material such as a resin monomer or the like as a dispersion medium in addition to the aforementioned dispersion medium, ultrafine particles can also be dispersed. Accordingly, the organic solvent-dispersed sol can be directly cured, and its production method can be simplified. Examples thereof include monomers such as an epoxy resin, an acrylic resin, a silicon resin and the like. Surface treatment of fine particles is properly determined depending on the polarity of the resin monomer in use. A method of replacing a dispersion medium by the use of an evaporator or the like can be taken.

The organically modified fine particles obtained as described above are very excellent in dispersibility to a resin component or a polymerizable compound so that fine particles can be dispersed in the resin composition and the transparent member uniformly and in a high concentration. Accordingly, it is possible to improve the refractive index of the transparent member while maintaining its strength.

When the resin composition of the present invention contains a resin component, organically modified fine particles are contained in an amount of 1 to 300 parts by weight, based on 100 parts by weight of the resin component. On the other hand, when a polymerizable compound is used, the resin composition of the present invention contains organically modified fine particles in an amount of 1 to 300 parts by weight, based on 100 parts by weight of the polymerizable compound.

Patent Document 2 discloses a resin composition containing about 80 parts by weight of inorganic fine particles, based on 100 parts by weight of the resin component. On the other hand, organically modified fine particles used in the present invention are excellent in dispersibility so that the particles can be contained in the resin composition in a high concentration, and can be contained even in an amount of not less than 100 parts by weight, based on 100 parts by weight of the resin component (or polymerizable compound).

The resin composition of the present invention contains organically modified fine particles in the above amount so that it is possible to obtain a transparent member having excellent transparency, high refractive index and high strength. In particular, organically modified fine particles used in the present invention are produced in the presence of high-temperature high-pressure water in the desirable supercritical state or subcritical state as a reaction field whereby an organic material is bonded to the surface of metal fine particles. So, even though the content of organically modified fine particles is increased, the dispersibility is good. Accordingly, it is possible to enhance the refractive index of the transparent member while maintaining its strength and transparency by increasing the content of organically modified fine particles.

Method for Producing Transparent Member

Next, a method for producing a transparent member obtained from the resin composition of the present invention will be described.

As a method for producing a transparent member using a resin composition containing a resin component and organically modified fine particles, there can be cited a method involving uniformly mixing a solution obtained by dissolving a resin component with organically modified fine particles to obtain a thin film by removing a solvent, a method involving melt-kneading a resin component and organically modified fine particles, and then carrying out extrusion molding or injection molding, and the like. Incidentally, instead of organically modified fine particles, an additive containing organically modified fine particles can also be used.

On the other hand, the resin composition (polymerizable composition) containing a polymerizable compound and organically modified fine particles is polymerized under heating or at ordinary temperature or under cooling in the presence of a curing catalyst, whereby it is possible to produce a transparent member. In this case, as the kind of the curing catalyst in use, there can be cited amines, phosphines, organic acids and salts thereof, ester, anhydrides, inorganic acids, quaternary ammonium salts, quaternary phosphonium salts, tertiary sulfonium salts, secondary iodonium salts, Lewis acids, radical polymerization catalysts, cationic polymerization catalysts and the like.

Concrete examples of the curing catalyst include aliphatic and aromatic tertiary amines such as triethylamine, tri-n-butylamine, tri-n-hexylamine, N,N-diisopropylethylamine, triethylenediamine, triphenylamine, N,N-dimethylethanolamine, N,N-diethylethanolamine, N,N-dibutylethanolamine, triethanolamine, N-ethyldiethanolamine, N,N-dimethylbenzylamine, N,N-diethylbenzylamine, tribenzylamine, N-methyldibenzylamine, N,N-dimethylcyclohexylamine, N,N-diethylcyclohexylamine, N,N-dimethylbutylamine, N-methyldicyclohexylamine, N-methylmorpholine, N-isopropylmorpholine, pyridine, quinoline, N,N-dimethylaniline, N,N-diethylaniline, α-, β- or γ-picoline, 2,2'-bipyridyl, 1,4-dimethylpiperazine, dicyandiamide, tetramethylethylenediamine, hexamethylenetetramine, 1,8-diazabicyclo(5,4,0)-7-undecene, 2,4,6-tris(N,N-dimethylaminomethyl)phenol and the like;

phosphines such as trimethylphosphine, triethylphosphine, tri-n-propylphosphine, triisopropylphosphine, tri-n-butylphosphine, triphenylphosphine, tribenzylphosphine, 1,2-bis(diphenylphosphino)ethane, 1,2-bis(dimethylphosphino)ethane and the like;

trihalogenoacetic acids and esters, anhydrides and salts thereof such as trifluoroacetic acid, trichloroacetic acid, trifluoroacetic anhydride, ethyl trifluoroacetate, sodium trifluoroacetate and the like; p-toluenesulfonic acid; methanesulfonic acid; trihalogenomethanesulfonic acids and esters, anhydrides and salts thereof such as trifluoromethanesulfonic acid, trifluoromethanesulfonic anhydride, ethyl trifluoromethanesulfonate, sodium trifluoromethanesulfonate and the like; inorganic acids such as hydrochloric acid, sulfuric acid, nitric acid and the like;

quaternary ammonium salts such as tetramethylammonium chloride, tetrabutylammonium chloride, tetrabutylammonium bromide and the like;

quaternary phosphonium salts such as tetramethylphosphonium chloride, tetrabutylphosphonium chloride, tetrabutylphosphonium bromide and the like;

tertiary sulfonium salts such as trimethylsulfonium bromide, tributylsulfonium bromide and the like; secondary iodonium salts such as diphenyliodonium bromide and the like;

organotin compounds such as dimethyltin dichloride, dibutyltin dichloride, dibutyltin dilaurate, dibutyltin diacetate, tetrachlorotin, dibutyltin oxide, diacetoxytetrabutyldistannoxane and the like, zinc chloride, acetylacetone zinc, aluminum chloride, aluminum fluoride, triphenyl aluminum, acetylacetone aluminum, isopropoxide aluminum, tetrachlorotitanium and complexes thereof, tetraiodotitanium, titanium alkoxides such as dichlorotitanium diisopropoxide, titanium isopropoxide and the like, calcium acetate, Lewis acids such as boron trihalide compounds and complexes thereof such as boron trifluoride, boron trifluoride diethyl ether complex, boron trifluoride piperidine complex, boron trifluoride ethylamine complex, boron trifluoride acetic acid complex, boron trifluoride phosphoric acid complex, boron trifluoride t-butyl methyl ether complex, boron trifluoride dibutyl ether complex, boron trifluoride THF complex, boron trifluoride methyl sulfide complex, boron trifluoride phenol complex and the like, boron trichloride complexes and the like;

radical polymerization catalysts such as 2,2'-azobis(2-cyclopropylpropionitrile), 2,2'-azobis(4-methoxy-2,4-dimethylvaleronitrile), 2,2'-azobis(2,4-dimethylvaleronitrile), t-butylperoxy-2-ethylhexanoate, n-butyl-4,4'-bis(t-butylperoxy)valerate, t-butylperoxybenzoate and the like; and cationic polymerization catalysts such as diphenyliodonium hexafluorophosphate, diphenyliodonium hexafluoroarsenate, diphenyliodonium hexafluoroantimony, triphenylsulfonium tetrafluoroborate, triphenylsulfonium hexafluorophosphate, triphenylsulfonium hexafluoroarsenate and the like, but are not restricted to these exemplified compounds alone.

The aforementioned curing catalysts may be used singly or in a mixture of two or more compounds. A mixture of two or more kinds of curing catalysts having different reactivities is preferably used for improving the monomer handleability, and the optical physical properties, color, transparency and optical inhomogeneity (striation) of the resultant resin in some cases.

Of these exemplified compounds, preferable examples include one or more compounds selected from the compound group consisting of tertiary amines such as tri-n-butylamine, tri-n-hexylamine, N,N-dimethylethanolamine, N,N-diethylethanolamine, N,N-dibutylethanolamine, N,N-dimethylcyclohexylamine, N,N-diethylcyclohexylamine, N,N-dimethylbutylamine and the like; phosphines such as trimethylphosphine, triethylphosphine, tri-n-propylphosphine, triisopropylphosphine, tri-n-butylphosphine, triphenylphosphine, tribenzylphosphine, 1,2-bis(diphenylphosphino)ethane, 1,2-bis(dimethylphosphino)ethane and the like; quaternary ammonium salts such as tetramethylammonium chloride, tetrabutylammonium chloride, tetrabutylammonium bromide and the like; quaternary phosphonium salts such as tetramethylphosphonium chloride, tetrabutylphosphonium chloride, tetrabutylphosphonium bromide and the like; and organotin compounds such as dimethyltin dichloride, dibutyltin dichloride, dibutyltin dilaurate, dibutyltin diacetate, tetrachlorotin, dibutyltin oxide, diacetoxytetrabutyldistannoxane and the like. When two or more compounds are selected, such compounds are more preferably used from the viewpoints of the optical physical properties, color, transparency, optical strain (stria) and yield of the resultant resin.

The amount of the curing catalyst in use is in the range of 0.001 to 10 weight %, preferably in the range of 0.002 to 5 weight % and more preferably in the range of 0.005 to 1 weight %, based on the total weight of the polymerizable composition of the present invention. With the amount of the curing catalyst to be added in this range, a sufficiently cured resin can be produced, and a pot life can be maintained. Also, the obtained resin has good transparency and optical physical properties in some cases.

In some cases, in order to obtain a good optical material, a known compound or the like is preferably added as a stabilizer or a resin modifier for improving a resin and handleability, for example, for controlling the optical physical properties such as the refractive index and Abbe's number and the like, physical properties such as color, light resistance, weather resistance, heat resistance, impact resistance, hardness, specific gravity, linear expansion coefficient, polymerization shrinkability, water absorption, hygroscopicity, chemical resistance, viscoelasticity and the like, and transmittance and transparency of a transparent member produced by polymerizing/curing the polymerizable composition of the present invention, and controlling the viscosity of the polymerizable composition, and preservation and transport handleability. Examples of the compound added for improving stability such as polymerization stability or the like include a polymerization retardant, a polymerization inhibitor, a deoxidant, an antioxidant and the like. However, the compounds are not limited to these examples.

Examples of the resin modifier which can be added include known compounds, other than the compounds contained in the polymerizable composition of the present invention, such as episulfide compounds, amine compounds, thiol compounds, phenols, mercaptoorganic acids, organic acids, anhydrides, amino acids, mercapto amines, olefins containing (meth)acrylates and the like.

As a typical polymerization method for producing the optical material (for example, a plastic lens) of the present invention, casting polymerization can be cited. That is, the polymerizable composition of the present invention is injected into a mold which is maintained with a gasket or a tape, or the like. At this time, the polymerizable composition may be mixed with a resin modifier, and subjected to an operation such as a reduced-pressure treatment such as degassing, filtration or the like as necessary. Next, the composition can be cured by allowing it to stand at room temperature or heating in a heating apparatus such as an oven or in water or the like, and then an optical material can be taken out from the mold.

The heating polymerization conditions for the polymerizable composition of the present invention injected into the mold are greatly different depending on the kinds of the polymerizable composition of the present invention and the ultraviolet absorber, the kind of the resin modifier, the kind of the curing catalyst, the shape of the mold and the like, and are not limited. However, polymerization is carried out at a temperature of about −50 to 200 degrees centigrade over 0.1 to 100 hours. Depending on the situation, in some cases, preferable results are obtained by maintaining at a temperature in the range of 10 to 150 degrees centigrade or by slowly heating for conducting polymerization for 1 to 80 hours.

The polymerization time of the polymerizable composition of the present invention can be reduced by irradiation with an energy beam such as an electron beam, an ultraviolet ray or the like. In this case, the curing catalyst such as a radical polymerization catalyst, a cationic polymerization catalyst or the like may be added.

Upon molding the optical material of the present invention, similar to the known molding method, various substances such as a stabilizer, a resin modifier other than the aforementioned resin modifier, a chain extender, a crosslinking agent, a photostabilizer typified by a HALS-type, an ultraviolet absorber other than the aforementioned ultraviolet absorber, an antioxidant typified by a hindered phenol type, a coloring inhibitor, a dye typified by an anthraquinone disperse dye, a pigment, a filler, an external mold releasing agent typified by a silicone-type or acidic phosphate, neutral phosphate, quaternary ammonium salt or an internal mold releasing agent typified by a quaternary phosphonium salt, an adhesion improving agent and the like may be added, depending on the purposes.

The amount of each of the additives which can be added as described above depends upon the kind, structure and effect of each additive and is not limited, but the amount is usually in the range of 0.001 to 10 weight % and preferably in the range of 0.01 to 5 weight %, based on the total weight of the composition. The dye added is preferably used in the range of 1 ppb to 100 ppm, not in the above-described range in some cases. Within these ranges, a sufficiently cured optical material can be produced, and the obtained optical material has good transparency and optical physical properties in some cases. Also, the taken-out optical material may be subjected to a treatment such as annealing or the like as necessary. The annealing condition is different depending on the structure of the compound constituting the polymerizable composition to be cured and is not limited. However, annealing is usually performed at 30 to 200 degrees centigrade. From the viewpoints of transparency and color of the resultant optical material, it is preferably performed at 50 to 150 degrees centigrade and more preferably 70 to 130 degrees centigrade.

The transparent member obtained according to the above production method can be obtained as a transparent member having a high refractive index of the e-ray (546 nm) of not less than 1.71, preferably not less than 1.76 and more preferably not less than 1.80.

When organically modified fine particles used in the present invention are contained in the transparent member, the refractive index of the e-ray is different depending on the content, the kind of the resin or the like, but the refractive index of the e-ray is increased by at least 0.05 and preferably by at least 0.1 as compared to the case in which organically modified fine particles are not contained. Accordingly, even in a resin having a low refractive index, it is possible to give a molded product having a high refractive index utilizing properties of the resin by using organically modified fine particles together.

Furthermore, the transparent member contains a metal component in an amount of 1 to 300 parts by weight, based on 100 parts by weight of the polymer and the resin component. Besides, the metal component is derived from organically modified fine particles.

Patent Document 2 discloses a resin composition containing inorganic fine particles in an amount of about 80 parts by weight, based on 100 parts by weight of the resin component. On the other hand, organically modified fine particles used in the present invention are excellent in dispersibility so that the particles can be contained in the transparent member in a high concentration, and can be contained even in an amount of not less than 100 parts by weight, based on 100 parts by weight of the resin component (or the polymer).

Since the transparent member of the present invention contains organically modified fine particles in the above amount, the transparent member is also excellent in transparency, and has high refractive index and high strength.

Use

The resin composition of the present invention can be molded into products of various molded (transparent members) of various shapes by changing the mold to be used upon casting polymerization. The resin composition can be used for various applications as an optical material utilizing characteristics of high refractive index and transparency such as a spectacle lens, a camera lens, a light emitting diode (LED) or the like. Particularly, the resin composition is suitably used as an optical material such as a spectacle lens, a camera lens or the like.

Furthermore, examples thereof include materials of high refractive index optical members such as an optical prism, an optical waveguide, an optical fiber, a thin-film molded product, an adhesive for optical uses, a sealing material for optical semiconductors, a diffraction grating, a light guiding plate, a liquid crystal substrate, a light reflection plate, an anti-reflection material and the like.

A lens using the optical material of the present invention can be subjected, if necessary, to physical or chemical treatment such as surface polishing, antistatic treatment, hard coating treatment, non-reflecting coating treatment, dyeing treatment or the like, in order to prevent reflection, impart high hardness, improve abrasion resistance or chemical resistance, impart defogging property or fashionability.

The resin composition of the present invention can be subjected to conventionally known molding methods such as extrusion molding, injection molding, vacuum molding, blow molding, compression molding and the like, to obtain various molded products such as disks, films and the like.

EXAMPLES

The present invention is now illustrated below with reference to Examples. However, the present invention is not restricted to these Examples.

Incidentally, for the performance tests, the lenses obtained in Examples were evaluated in accordance with the following method.

Refractive index (ne): The refractive index of the e-ray (546 nm) was measured at 20 degrees centigrade using a Pulfrich refractometer.

Resin transparency: Visually observed.

Example 1

Synthesis of Organically Modified Fine Particles using Supercritical Water 8.5 g of 0.01 Mol/l Zn $(NO_3)_2$ and 0.5 g of hexanoic acid were put into a 20-cc reaction tube (SUS316, ½ inch) and the resulting material was sealed. The reaction tube was put into a sand bath at 400 degrees centigrade and heated. Heating was continued to a temperature of 400 degrees centigrade for two minutes. After the reaction for 10 minutes as it was, the reaction tube was put into cold water for cooling. The reaction solution was poured into distilled water, and repeatedly subjected to centrifugal separation and decantation several times. Furthermore, the resulting solution was subjected to centrifugal separation and decantation with ethanol, and then vacuum-dried, whereby organically surface-modified zinc oxide fine particles were obtained.

Production of Resin Composition and Lens 0.05 g of bis(mercaptoethyl)sulfide, 2 mg of N,N-dimethylcyclohexylamine as a catalyst and 1.5 g of organically surface-modified fine particles synthesized according to the above method were added to 0.95 g of bis(2,3-epithiopropyl) sulfide for well mixing. The resulting mixture was degassed under 0.6 kPa for 0.5 hour and then injected into a lens mold. The mold was gradually heated from 30 to 120 degrees centigrade to perform polymerization/curing over 24 hours, and cooled. Then, the glass mold was released and a lens was taken out from the mold. The results of performance test of the obtained lens are shown in Table 1.

Example 2

The same procedure as in Example 1 was conducted, except that 8 g of 0.01 Mol/l Zr $(NO_3)_2$ was used in place of 8.5 g of 0.01 Mol/l Zn $(NO_3)_2$ and 1 g of decanoic acid was used in place of 0.5 g of hexanoic acid. The results of performance test are shown in Table 1.

Example 3

The same procedure as in Example 1 was conducted, except that 8 g of 0.01 Mol/l $Ti(SO_4)_2$ was used in place of 8.5 g of 0.01 Mol/l $Zn(NO_3)_2$ and 1 g of decanoic acid was used in place of 0.5 g of hexanoic acid. The results of performance test are shown in Table 1.

Example 4

The same procedure as in Example 1 was conducted, except that 8.5 g of 0.01 Mol/l Ti $(SO_4)_2$ was used in place of 8.5 g of 0.01 Mol/l $Zn(NO_3)_2$ and 0.5 g of hexanethiol was used in place of 0.5 g of hexanoic acid. The results of performance test are shown in Table 1.

Example 5

The same procedure as in Example 1 was conducted, except that 8.5 g of 0.01 Mol/l $Ti(SO_4)_2$ was used in place of 8.5 g of 0.01 Mol/l $Zn(NO_3)_2$ and 0.5 g of hexanol was used in place of 0.5 g of hexanoic acid. The results of performance test are shown in Table 1.

Example 6

The same procedure as in Example 1 was conducted, except that 8.5 g of 0.01 Mol/l Ti(SO$_4$)$_2$ was used in place of 8.5 g of 0.01 Mol/l Zn(NO$_3$)$_2$ and 0.5 g of hexylamine was used in place of 0.5 g of hexanoic acid. The results of performance test are shown in Table 1.

Example 7

The same procedure as in Example 1 was conducted, except that 8 g of 0.01 Mol/l Ti (SO$_4$)$_2$ and 0.5 g of 0.01 Mol/l 5 nCl$_4$ were used in place of 8.5 g of 0.01 Mol/l Zn (NO$_3$)$_2$. The results of performance test are shown in Table 1.

Production Example 1

Synthesis of Titanium Oxide Using Supercritical Water 9 g of 0.1 Mol/l TiC$_4$ was introduced into a 20-cc reaction tube (SUS 316, ½ inch) and TiCl$_4$ was sealed. The reaction tube was put into a sand bath at 400 degrees centigrade and heated. It took 2 minutes to heat to a temperature of 400 degrees centigrade. After the reaction for 10 minutes as it was, the reaction tube was put into cold water for cooling. The reaction solution was poured into distilled water, and repeatedly subjected to centrifugal separation and decantation several times. Furthermore, the resulting solution was subjected to centrifugal separation and decantation with ethanol, and then vacuum-dried, whereby titanium oxide fine particles in which the surface was not modified were obtained.

Comparative Example 1

The same procedure as in Example 1 was conducted, except that polymerization was conducted only with a polymerizable compound without mixing with organically modified fine particles. The results are shown in Table 1.

Comparative Example 2

The same procedure as in Example 1 was conducted, except that titanium oxide fine particles prepared in Production Example 1 were used in place of organically modified fine particles. The results are shown in Table 1.

Comparative Example 3

Centrifugal separation and decantation were carried out with methanol in place of ethanol in Production Example 1 to give a 20 weight % methanol-dispersed sol. After sulfuric acid was added to 10 g of this sol to adjust a pH to 5, and then 0.1 g of 3-aminopropyltrimethoxysilane was added thereto, and the resulting mixture was heated at 50 degrees centigrade. An operation of concentration by adding methanol was repeatedly conducted using a rotary evaporator, and then the resultant methanol-dispersed sol was vacuum-dried to obtain a white powder.

A lens was prepared in the same manner as in Example 1 using the resultant surface-modified fine particles, and its performance was evaluated. The results are shown in Table 1.

Production Example 2

Synthesis of Rutile-Type Titanium Oxide 5 ml of an aqueous hydrochloric acid solution of titanium oxide chloride (containing 15 weight % of Ti) was added to 50 ml of ion exchange water. The pH of the solution was −0.1. The reaction mixture was stirred using a magnetic stirrer and heated at 50 degrees centigrade for 1 hour, and as a result, a white precipitate was obtained. The resultant white precipitate was not re-dispersed in ion exchange water. Powder X-ray diffraction measurement and electron microscope observation of this solid content were carried out. A transmission electron microscope was used for the electron microscope observation to observe the diluted sol added dropwise to a mesh at 0.2M magnifications and 2M magnifications. As a result, it was a rutile-type titanium oxide having an agglomerated particle diameter of not less than 200 nm.

Production Example 3

Production of Sol of Ultrafine Particles of Tin-Modified Rutile-Type Titanium Oxide 0.27 g of tin (IV) chloride pentahydrate was introduced into a 100-ml eggplant type flask and dissolved in 50 ml of ion exchange water, and 5 ml of an aqueous hydrochloric acid solution of titanium oxide chloride (containing 15 weight % of Ti) was added thereto. The pH of the solution was −0.1 (concentration of Ti introduced: 0.45, Sn/Ti molar ratio: 0.03). The reaction mixture was stirred using a magnetic stirrer and heated at 50 degree centigrade for 1 hour, and as a result, a white precipitate was obtained. The white precipitate was recovered by centrifugation and the precipitate was re-dispersed in ion exchange water. Ultrafiltration was carried out to obtain a sol containing 2 weight % of the solid content. Powder X-ray diffraction measurement and electron microscope observation of this solid content were carried out. The powder X-ray diffraction was measured after drying up by hot air at 120 degree centigrade for 2 hours and as a result, it was a rutile-type titanium oxide. A crystal grain diameter was calculated by using the Debye-Sherrer formula from half-value width of the diffraction peak. As a result, an average short axis and an average long axis of a crystal grain diameter had a length of 5 nm and 8 nm respectively. The electron microscope observation was conducted in the same manner as in Production Example 2. As a result, it was a rutile-type titanium oxide having an average agglomerated particle diameter of 23 nm. The element molar ratio of Sn/Ti according to the inductively coupled plasma analysis was 0.02.

Production Example 4

Production of Sol of Ultrafine Particles of Tin-Modified Rutile-Type Titanium Oxide Coated with Two-Layered Silicon Oxide 2,500 g of a sol containing ultrafine particles of a tin-modified rutile-type titanium oxide obtained in Production Example 3 was adjusted to have a pH of 3, and then heated at 80 degrees centigrade. 125 g of a 2 weight % aqueous silicon oxide solution was added dropwise over 1 hour, and further heated for 30 minutes, and cooled down to room temperature. Then, a 1 mol/l aqueous sodium hydroxide solution was added thereto to give a sol. While the resultant mixture was heated to 80 degrees centigrade and the pH was maintained at 9, 625 g of a 2 weight % aqueous silicon oxide solution was added dropwise over 2 hours and further heated for 4 hours. The resulting solution was purified by ultrafiltration to obtain a 2 weight % sol. The weight ratio of the coating layer to fine particles was 0.13/1 according to the inductively coupled plasma analysis. An operation of concentration by adding methanol was repeatedly conducted using a rotary evaporator, and then a 20 weight % methanol-dispersed sol was obtained.

Production Example 5

The same procedure as in Production Examples 3 and 4 was conducted, except that 0.9 g of tin (IV) chloride pentahydrate in Production Example 3 was used (concentration of Ti introduced: 0.45, Sn/Ti molar ratio: 0.1). The solid content of the resultant sol was analyzed in the same manner as in Production Example 3 and as a result, the element molar ratio of Sn/Ti was 0.06. An average short axis and an average long axis of a crystal grain diameter had a length of 5 nm and 8 nm respectively. It was a rutile-type titanium oxide having an average agglomerated particle diameter of 20 nm. The weight ratio of the coating layer to fine particles was 0.13/1. An operation of concentration by adding methanol was repeatedly conducted using a rotary evaporator, and then a 20 weight % methanol-dispersed sol was obtained.

Example 8

Titanium oxide fine particles (0.1 g on the solid basis) synthesized in Production Example 2 and a molecule for organic modifying (1 g of decanoic acid) were put into a 20-cc reaction tube (SUS316, ½ inch) and distilled water was added such that the total weight was 9 g, and the resulting material was sealed. The reaction tube was put into a sand bath at 400 degrees centigrade and heated. Heating was continued to a temperature of 400 degrees centigrade for two minutes. After the reaction for 10 minutes as it was, the reaction tube was put into cold water for cooling. The reaction solution was poured into distilled water, and repeatedly subjected to centrifugal separation and decantation several times. Furthermore, the resulting solution was subjected to centrifugal separation and decantation with ethanol, and then vacuum-dried, whereby organically surface-modified titanium oxide fine particles were obtained.

A lens was prepared in the same manner as in Example 1 using the resultant surface-treated titanium oxide fine particles, and its performance was evaluated. The results are shown in Table 1.

Example 9

The same procedure as in Example 8 was conducted, except that tin-modified titanium oxide fine particles (0.1 g on the solid basis) synthesized in Production Example 3 were used in place of titanium oxide fine particles (0.1 g on the solid basis) synthesized in Production Example 2 and 2 g of oleic acid was used in place of 1 g of decanoic acid to obtain the organically surface-modified titanium oxide fine particles containing tin.

A lens was prepared in the same manner as in Example 1 using the resultant surface-treated titanium oxide fine particles containing tin, and its performance was evaluated. The results are shown in Table 1.

Example 10

The same procedure as in Example 8 was conducted, except that tin-modified titanium oxide fine particles (0.1 g on the solid basis) synthesized in Production Example 4 were used in place of titanium oxide fine particles (0.1 g on the solid basis) synthesized in Production Example 2 and 1 g of hexanoic acid was used in place of 1 g of decanoic acid to obtain organically surface-modified tin-modified titanium oxide fine particles.

A lens was prepared in the same manner as in Example 1 using the resultant surface-treated tin-modified titanium oxide fine particles, and its performance was evaluated. The results are shown in Table 1.

Example 11

The same procedure as in Example 8 was conducted, except that tin-modified titanium oxide fine particles (0.1 g on the solid basis) synthesized in Production Example 5 were used in place of titanium oxide fine particles (0.1 g on the solid basis) synthesized in Production Example 2 and 1 g of hexanoic acid was used in place of 1 g of decanoic acid to obtain organically surface-modified tin-modified titanium oxide fine particles.

A lens was prepared in the same manner as in Example 1 using the resultant surface-treated tin-modified titanium oxide fine particles, and its performance was evaluated. The results are shown in Table 1.

Comparative Example 4

A lens was prepared in the same manner as in Example 1, except that non-modified fine particles obtained in Production Example 2 were used in place of organically modified zinc oxide fine particles, and its performance was evaluated. The results are shown in Table 1.

Comparative Example 5

A sol containing 2 weight % of the solid content obtained in Production Example 3 was used to give a 20 weight % methanol-dispersed sol in the same manner as in Production Example 4, and then vacuum-dried, whereby a white powder was obtained. A lens was prepared in the same manner as in Example 1, except that these non-modified fine particles were used in place of organically modified zinc oxide fine particles, and its performance was evaluated. The results are shown in Table 1.

Comparative Example 6

2 g of non-modified fine particles obtained in Production Example 2 was dispersed in methanol to prepare 100 g of a 2 weight % methanol-dispersed sol. Sulfuric acid was added to this sol to adjust pH 5 and then 1 g of 3-aminopropyltrimethoxysilane was added thereto, and the resulting mixture was heated at 50 degrees centigrade. An operation of concentration by adding methanol was repeatedly conducted using a rotary evaporator, and then the resultant methanol-dispersed sol was vacuum-dried to obtain a white powder.

A lens was prepared in the same manner as in Example 1, except that the resultant surface-modified fine particles were used in place of organically modified zinc oxide fine particles, and its performance was evaluated. The results are shown in Table 1.

Comparative Example 7

A sol containing 2 weight % of the solid content obtained in Production Example 3 was used to give a 20 weight % methanol-dispersed sol in the same manner as in Production Example 4. Sulfuric acid was added to 100 g of this sol to adjust pH 5 and then 1 g of 3-aminopropyltrimethoxysilane was added thereto, and the resulting mixture was heated at 50 degrees centigrade. An operation of concentration by adding methanol was repeatedly conducted using a rotary evaporator, and then the resultant methanol-dispersed sol was vacuum-dried to obtain a white powder.

A lens was prepared in the same manner as in Example 1, except that the resultant surface-modified fine particles were used in place of organically modified zinc oxide fine particles, and its performance was evaluated. The results are shown in Table 1.

Comparative Example 8

2.5 g of zinc acetate dihydrate and 2.7 g of hexanethiol were dissolved in 200 mL of dimethylformamide, and the resulting solution was put into a 3-necked flask and the inside of the reaction system was purged with nitrogen. A 2M aqueous sodium hydroxide solution was added to adjust a pH of the solution to 8 and the resulting solution was stirred at room temperature. While stirring at room temperature, 50 mL of an aqueous solution obtained by dissolving 2.7 g of sodium sulfide nonahydrate was added dropwise thereto from a dropping funnel over 30 minutes. The reaction solution was stirred at room temperature for 10 hours, and then poured into acetone to precipitate a precipitate, whereby zinc sulfide fine particles with the surface modified with hexanethiol by centrifugal separation were obtained.

A lens was prepared in the same manner as in Example 1, except that the resultant surface-modified fine particles were used in place of organically modified zinc oxide fine particles, and its performance was evaluated. The results are shown in Table 1.

Example 12

0.1 g of surface-modified zinc sulfide fine particles obtained in Comparative Example 8 and 0.5 g of hexanethiol were put into a 20-cc reaction tube (SUS316, ½ inch) and distilled water was added such that the total weight was 9 g, and the resulting material was sealed. The reaction tube was put into a sand bath at 400 degrees centigrade and heated. Heating was continued to a temperature of 400 degrees centigrade for two minutes. After the reaction for 10 minutes as it was, the reaction tube was put into cold water for cooling. The reaction solution was poured into distilled water, and repeatedly subjected to centrifugal separation and decantation several times. Furthermore, the resulting solution was subjected to centrifugal separation and decantation with ethanol, and then vacuum-dried, whereby zinc sulfide fine particles modified under the condition of high-temperature high-pressure water were obtained.

A lens was prepared in the same manner as in Example 1, except that the resultant surface-modified fine particles were used in place of organically modified zinc oxide fine particles, and its performance was evaluated. The results are shown in Table 1.

TABLE 1

| | Synthesis Method of Fine Particles | Method of Modification | Kind of Metal |
|---|---|---|---|
| Example 1 | Supercritical | Supercritical | ZnO |
| Example 2 | Supercritical | Supercritical | ZnO$_2$ |
| Example 3 | Supercritical | Supercritical | TiO$_2$ |
| Example 4 | Supercritical | Supercritical | TiO$_2$ |
| Example 5 | Supercritical | Supercritical | TiO$_2$ |
| Example 6 | Supercritical | Supercritical | TiO$_2$ |
| Example 7 | Supercritical | Supercritical | Sn-containing TiO$_2$ |
| Comp. Example 1 | N/A | — | — |
| Comp. Example 2 | Supercritical (Production Example 1) | N/A | TiO$_2$ |
| Comp. Example 3 | Supercritical (Production Example 1) | Coupling agent | TiO$_2$ |
| Example 8 | Sol-gel (Production Example 2) | Supercritical | TiO$_2$ |
| Example 9 | Sol-gel (Production Example 3) | Supercritical | Sn-containing TiO$_2$ |
| Example 10 | Sol-gel (Production Example 4) | Supercritical | Sn-containing TiO$_2$ (coated with SiO$_2$) |
| Example 11 | Sol-gel (Production Example 5) | Supercritical | High purity Sn-containing TiO$_2$ (coated with SiO$_2$) |
| Comp. Example 4 | Sol-gel (Production Example 2) | N/A | TiO$_2$ |
| Comp. Example 5 | Sol-gel (Production Example 3) | N/A | Sn-containing TiO$_2$ |
| Comp. Example 6 | Sol-gel (Production Example 2) | Coupling agent | TiO$_2$ |
| Comp. Example 7 | Sol-gel (Production Example 3) | Coupling agent | Sn-containing TiO$_2$ |
| Comp. Example 8 | Chemical synthesis method | N/A | ZnS |
| Example 12 | Chemical synthesis method | Supercritical | ZnS |

| | Modifier | Content of Metal Fine Particles (parts by weight)* | Refractive Index | Transparency |
|---|---|---|---|---|
| Example 1 | Hexanoic acid | 150 | 1.80 | Transparent |
| Example 2 | Decanoic acid | 150 | 1.89 | Transparent |
| Example 3 | Decanoic acid | 150 | 1.90 | Transparent |
| Example 4 | Hexanethiol | 150 | 1.92 | Transparent |
| Example 5 | Hexanol | 150 | 1.92 | Transparent |
| Example 6 | Hexylamine | 150 | 1.92 | Transparent |
| Example 7 | Hexanoic acid | 150 | 1.95 | Transparent |
| Comp. Example 1 | — | — | 1.70 | Transparent |
| Comp. Example 2 | — | — | — | Whitening |
| Comp. Example 3 | Aminopropyl-trimethodxy-silane | 150 | — | Slight whitening |
| Example 8 | Decanoic acid | 150 | 1.98 | Transparent |
| Example 9 | Oleic acid | 150 | 1.97 | Transparent |
| Example 10 | Hexanoic acid | 150 | 1.93 | Transparent |
| Example 11 | Hexanoic acid | 150 | 1.93 | Transparent |
| Comp. Example 4 | — | 150 | — | Whitening |
| Comp. Example 5 | — | 150 | — | Whitening |
| Comp. Example 6 | Aminopropyl-trimethodxy-silane | 150 | — | Whitening |
| Comp. Example 7 | Aminopropyl-trimethodxy-silane | 150 | — | Slight whitening |
| Comp. Example 8 | Hexanethiol | 150 | — | Slight whitening |
| Example 12 | Hexanethiol | 150 | 1.89 | Transparent |

*Content of organically modified fine particles (or metal fine particles), based on 100 parts by weight of the polymerizable compound Example 13

Production of Episulfide Resin Containing Surface-Modified Fine Particles

The same procedure as in Example 1 was conducted, except that 8.5 g of 0.01 Mol/l Ti(SO$_4$)$_2$ was used in place of 8.5 g of 0.01 Mol/l Zn(NO$_3$)$_2$. The results of performance test of the resultant lens are shown in Table 2.

Example 14

Production of Thiourethane Resin Containing Surface-Modified Fine Particles

Surface modified titanium oxide fine particles synthesized in the same manner as in Example 13 were used.

0.1 mg of dibutyltin dichloride as a catalyst, 1 mg of "Zelec UN" (trade name, acidic alkyl phosphate ester) manufactured by Stepan Co., Ltd. as an internal mold releasing agent and 0.5 mg of "Viosorb 583" (trade name) manufactured by Kyodo Chemical Co., Ltd. as an ultraviolet absorber were previously dissolved in 0.507 g of xylylene diisocyanate to prepare a mixture. Next, 0.493 g of 4,8-dimercaptomethyl-1,11-mercapto-3,6,9-trithiaundecane and 1.5 g of the aforementioned surface-modified titanium oxide fine particles were added and mixed well to give a monomer mixture. This monomer mixture was degassed at 0.6 kPa for 1 hour, and then injected into a lens mold, and the mold was slowly heated from 40 to 130 degrees centigrade to perform curing over 20 hours. After cooling, the glass mold was released and a lens was taken out from the mold. The results of performance test of the resultant lens are shown in Table 2.

Example 15

Production of Episulfide/Thiourethane Copolymer Resin Containing Surface-Modified Fine Particles Surface-modified titanium oxide fine particles synthesized in the same manner as in Example 13 were used.

At room temperature of 20 degrees centigrade, 0.75 g of bis(2,3-epithiopropyl)sulfide, 0.12 g of bis(2-mercaptoethyl)sulfide, 0.03 g of pentaerythritol tetrakis(2-mercaptoacetate) and 0.7 mg of tetra-n-butylphosphonium bromide were mixed and dissolved with stirring until the mixture became transparent. Separately from this, 0.1 g of m-xylylene diisocyanate, 0.1 mg of dibutyltin dichloride and 0.2 mg of "ZelecUN" (trade name, acidic alkyl phosphate ester) manufactured by Stepan Co., Ltd. were mixed and dissolved with stirring until the mixture became transparent. Two kinds of prepared solutions were mixed, and 1.5 g of the aforementioned organically surface-modified fine particles were further mixed, and then degassed under a reduced pressure for 0.5 hour. The resultant mixture was injected into a lens mold, and the mold was slowly heated from 30 to 120 degrees centigrade to perform polymerization over 24 hours. After completion of the polymerization, the resultant lens was released from the mold and subjected to annealing at 120 degrees centigrade for 2 hours. The results of performance test of the resultant lens are shown in Table 2.

TABLE 2

| | Polymerizable Compound | Synthesis Method | Modification Method | Kind of Metal |
|---|---|---|---|---|
| Example 13 | Episulfide | Supercritical | Supercritical | $TiO_2$ |
| Example 14 | Thiourethane | Supercritical | Supercritical | $TiO_2$ |
| Example 15 | Episulfide/Thiourethane Copolymer | Supercritical | Supercritical | $TiO_2$ |

TABLE 2-continued

| | Modifier | Content of Metal Fine Particles (parts by weight)* | Refractive Index | Transparency |
|---|---|---|---|---|
| Example 13 | Hexanoic acid | 150 | 1.92 | Transparent |
| Example 14 | Hexanoic acid | 150 | 1.89 | Transparent |
| Example 15 | Hexanoic acid | 150 | 1.90 | Transparent |

*Content of organically modified fine particles (or metal fine particles), based on 100 parts by weight of the polymerizable compound

Examples 16 to 18

The same procedure as in Example 13 was conducted, except that organically modified fine particles were added so as to be the ratio described in Table 3, based on the total amount of 100 parts by weight of bis(2,3-epithiopropyl)sulfide and bis(mercaptoethyl)sulfide. The results of performance test of the resultant lens are shown in Table 3.

Examples 19 to 20 and Comparative Example 9

The organically modified fine particles were synthesized in the same manner as in Example 1, except that 8.5 g of 0.01 Mol/l $Ti(SO_4)_2$ was used in place of 8.5 g of 0.01 Mol/l $Zn(NO_3)_2$, and 1 g of decanoic acid was used in place of 0.5 g of hexanoic acid. When a lens monomer mixture was prepared by using the resultant organically modified fine particles, the same procedure as in Example 14 was conducted, except that organically modified fine particles were added so as to be the ratio described in Table 3, based on the total amount of 100 parts by weight of xylylene diisocyanate and 4,8-dimercaptomethyl-1,11-mercapto-3,6,9-trithiaundecane. The results of performance test are shown in Table 3.

TABLE 3

| | Polymerizable Compound | Synthesis Method | Modification Method | Kind of Metal |
|---|---|---|---|---|
| Example 16 | Episulfide | Supercritical | Supercritical | $TiO_2$ |
| Example 17 | Episulfide | Supercritical | Supercritical | $TiO_2$ |
| Example 18 | Episulfide | Supercritical | Supercritical | $TiO_2$ |
| Example 19 | Thiourethane | Supercritical | Supercritical | $TiO_2$ |
| Example 20 | Thiourethane | Supercritical | Supercritical | $TiO_2$ |
| Comp. Example 9 | Thiourethane | Supercritical | Supercritical | $TiO_2$ |

| | Modifier | Content of Metal Fine Particles (parts by weight)* | Refractive Index | Transparency |
|---|---|---|---|---|
| Example 16 | Hexanoic acid | 1 | 1.71 | Transparent |
| Example 17 | Hexanoic acid | 25 | 1.76 | Transparent |
| Example 18 | Hexanoic acid | 50 | 1.80 | Transparent |
| Example 19 | Decanoic acid | 150 | 1.89 | Transparent |
| Example 20 | Decanoic acid | 300 | 1.99 | Transparent |
| Comp. Example 9 | Decanoic acid | 400 | — | Slight whitening |

*Content of organically modified fine particles, based on 100 parts by weight of the polymerizable compound As clear from the results of Table 3, a transparent member excellent in any of the refractive index and transparency is obtained from the resin composition containing organically modified fine particles in an amount of 1 to 300 parts by weight, based on 100 parts by weight of the polymerizable compound.

The invention claimed is:

1. A polymerizable composition comprising:
   a polymerizable compound comprised of one or more selected from a polymerizable compound having an episulfide group and a polymerizable compound comprised of a polythiol compound and an iso(thio)cyanate compound and
   an organically modified fine particle produced in the presence of a high-temperature high-pressure water as a reaction field, in which an organic material is bonded to the surface of a metal fine particle,
   wherein said organic material is at least one selected from the group consisting of hexanoic acid, decanoic acid, hexanethiol, hexanol, hexylamine and oleic acid.

2. The polymerizable composition as set forth in claim 1, wherein said high-temperature high-pressure water is water in the supercritical state or subcritical state.

3. The polymerizable composition as set forth in claim 1, wherein said organically modified fine particle is produced by heating and pressurizing a solution containing a metal salt and an organic material at a temperature of 200 to 500 degrees centigrade under a pressure of 5 to 50 MPa to make a water into the supercritical state or subcritical state.

4. The polymerizable composition as set forth in claim 1, wherein said organically modified fine particle is produced by heating and pressurizing a solution containing a metal fine particle and an organic material at a temperature of 200 to 500 degrees centigrade under a pressure of 5 to 50 MPa to make a water into the supercritical state or subcritical state.

5. The polymerizable composition as set forth in-claim 1, wherein the refractive index of the e-ray of a molded product obtained from said polymerizable composition is not less than 1.71.

6. The polymerizable composition as set forth in claim 1, wherein said metal fine particle in said organically modified fine particle contains a metal oxide fine particle and/or a metal sulfide fine particle, and a metal component of said metal oxide fine particle or said metal sulfide fine particle is one or more selected from the group consisting of titanium, zirconium, zinc, antimony, magnesium, potassium, barium, aluminum, calcium, tellurium, selenium, cerium and tin.

7. The polymerizable composition as set forth in claim 6, wherein said metal oxide fine particle is a ZnO-containing fine particle, a $ZrO_2$-containing fine particle, a $TiO_2$-containing fine particle or a Sn and $TiO_2$-containing fine particle.

8. The polymerizable composition as set forth in claim 6, wherein said metal sulfide fine particle is a ZnS-containing fine particle.

9. The polymerizable composition as set forth in claim 1, wherein an average particle diameter of said organically modified fine particle is from 1 to 100 nm.

10. The polymerizable composition as set forth in claim 1, wherein said organically modified fine particle is contained in an amount of 1 to 300 parts by weight, based on 100 parts by weight of said polymerizable compound.

11. The polymerizable composition as set forth in claim 1, wherein said organically modified fine particle is contained in an amount of 100 to 300 parts by weight, based on 100 parts by weight of said polymerizable component.

12. The polymerizable composition as set forth in claim 1, wherein said metal fine particle is provided with one or more coating layers comprised of an inorganic material on the surface thereof and said organic material is bonded to the surface of said coating layer(s).

13. A transparent member obtained from the polymerizable composition as set forth in claim 1 comprising a polymer obtained by polymerizing said polymerizable compound and said organically modified fine particle.

14. The transparent member as set forth in claim 13, wherein a metal component is contained in an amount of 1 to 300 parts by weight, based on 100 parts by weight of said polymer.

15. An optical component comprising the transparent member as set forth in claim 13.

16. An optical lens comprising the transparent member as set forth in claim 13.

* * * * *